United States Patent [19]

Yanagisawa et al.

[11] Patent Number: 5,484,967
[45] Date of Patent: Jan. 16, 1996

[54] COORDINATE INPUT APPARATUS

[75] Inventors: Ryozo Yanagisawa, Matsudo; Atsushi Tanaka, Kawasaki; Yuichiro Yoshimura, Kamakura; Kiyoshi Kaneko, Yokohama; Katsuyuki Kobayashi, Yokohama; Masaki Tokioka, Yokohama, all of Japan

[73] Assignee: Canon Kabushiki Kaisha, Tokyo, Japan

[21] Appl. No.: 128,664

[22] Filed: Sep. 30, 1993

[30] Foreign Application Priority Data

Oct. 1, 1992 [JP] Japan ................................. 4-263407

[51] Int. Cl.⁶ ..................................... C08C 21/00
[52] U.S. Cl. ................................... 178/19; 345/177
[58] Field of Search ................... 178/18, 19; 345/177, 345/156; 367/907

[56] References Cited

FOREIGN PATENT DOCUMENTS

| 258972 | 3/1988 | European Pat. Off. ....... G06K 11/06 |
| 467296 | 1/1992 | European Pat. Off. ....... G06K 11/16 |
| 0467296 | 1/1994 | European Pat. Off. . |
| 0597228 | 5/1994 | European Pat. Off. . |
| 0530836 | 10/1994 | European Pat. Off. . |

OTHER PUBLICATIONS

*Patent abstracts of Japan,* vol. 013, No. 257, Kokai 1–214921 (Yoshimura et al.), Aug. 1989.

*Primary Examiner*—Stephen Chin
*Assistant Examiner*—Paul Loomis
*Attorney, Agent, or Firm*—Fitzpatrick, Cella, Harper & Scinto

[57] ABSTRACT

Some components of a vibration input to an input guarantee region on a vibration transmission plate directly reach a vibration sensor, but some other components are reflected by the end portion of the vibration transmission plate, and then reach the vibration sensor. A vibration suppressor is attached to a peripheral edge of the vibration transmission plate, and is located along the path of the vibration reflected by the end portion of the vibration transmission plate to the vibration sensor. Since the vibration sensor is attached to a corner portion of the vibration transmission plate where no vibration suppressor is attached, a decrease in coordinate detection precision caused by reflected waves can be suppressed, and a compact apparatus can be realized.

7 Claims, 18 Drawing Sheets

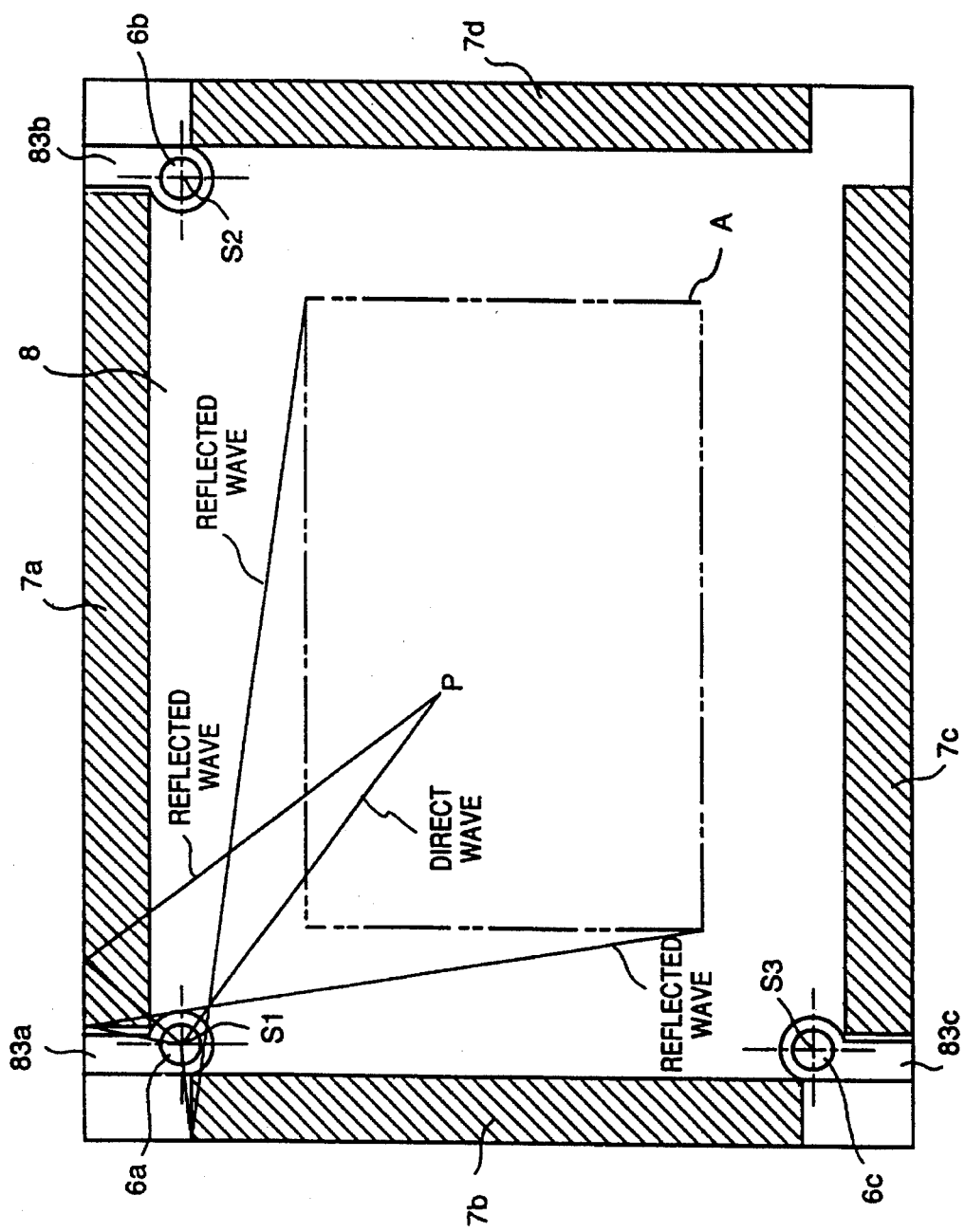

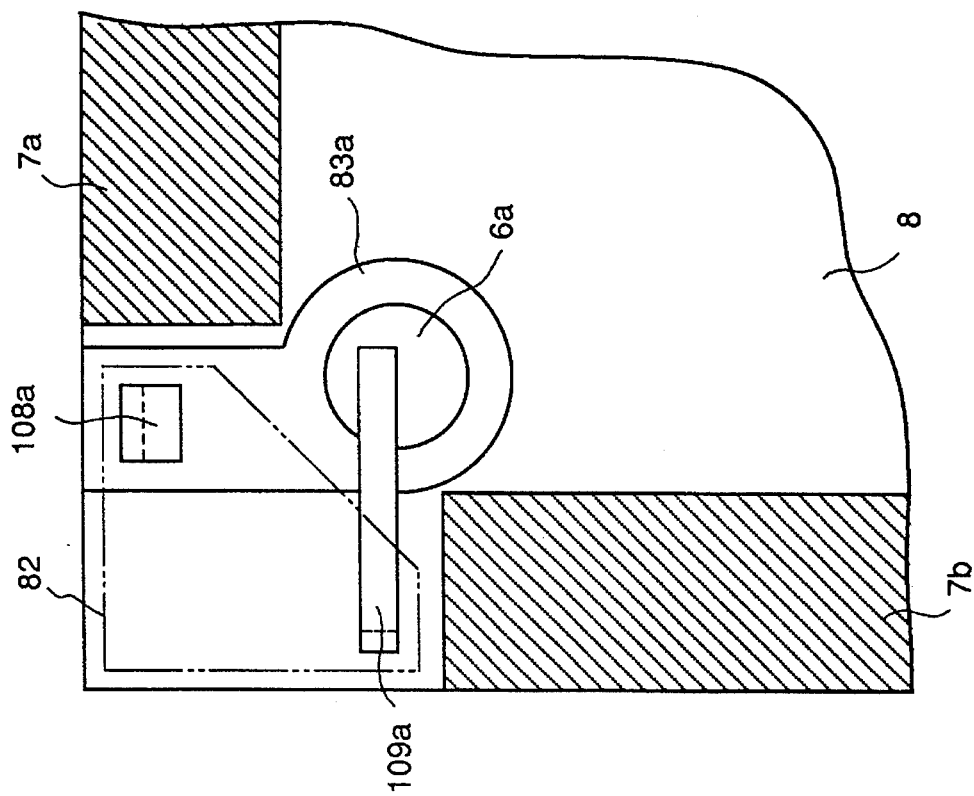
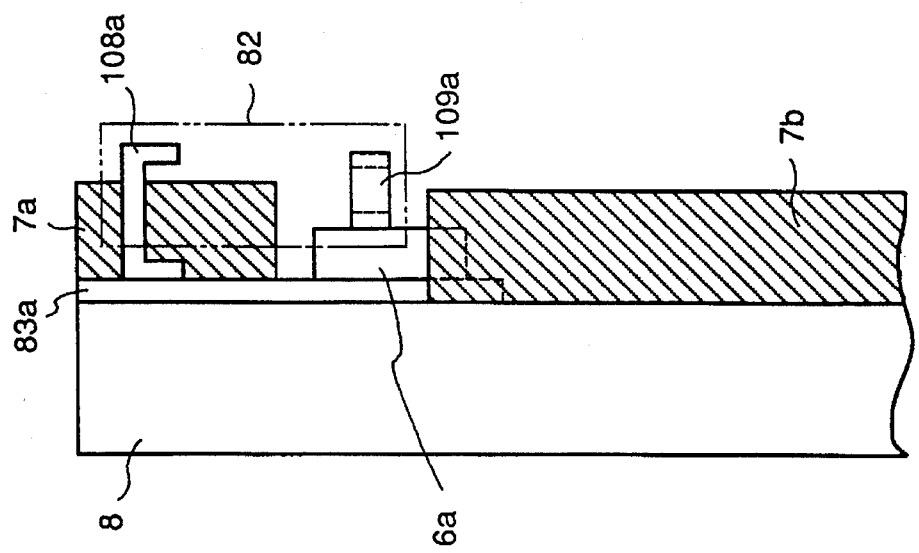

5,484,967

COORDINATE INPUT APPARATUS

FIELD OF THE INVENTION

The present invention relates to a coordinate input apparatus for detecting input position coordinates by utilizing, e.g., transmission of a vibration generated by a device for inputting a vibration.

DESCRIPTION OF THE PRIOR ART

Conventionally, a coordinate input apparatus, in which a vibration is input from a vibration input pen incorporating a piezoelectric element to a vibration transmission plate, and the position coordinates of the input pen are detected by a plurality of sensors provided to the transmission plate, is known. FIGS. 9 to 12 show the typical arrangement of the coordinate input apparatus.

FIG. 9 shows the schematic arrangement of the entire coordinate input apparatus. Referring to FIG. 9, the coordinate input apparatus comprises a vibration input pen 3, a vibration transmission plate 8, vibration sensors 6a to 6d, vibration suppressors 7a to 7d, an arithmetic control circuit 1, a vibration driving circuit 2, and a signal detection circuit 9. More specifically, the arithmetic control circuit 1 for controlling the entire apparatus, and calculating a coordinate position supplies a pulse signal for driving a vibrator 4 incorporated in the input pen 3 to the driving circuit 2. The driving circuit 2 amplifies the pulse signal with a predetermined gain, and supplies the amplified pulse signal to the vibrator 4. The electrical driving signal is converted into a mechanical vibration by the vibrator 4, and is input to the vibration transmission plate 8 via the pen tip of the input pen 3. The input vibration propagates through the vibration transmission plate 8, and reaches the sensors 6a to 6d. The sensors 6a to 6d are sensors such as piezoelectric elements for converting a mechanical vibration into an electrical vibration. The sensors 6a to 6d detect the arrived vibration, and output electrical signals. The output electrical signals are converted into signals indicating the arrival timings of the vibration at the sensors 6a to 6d by predetermined waveform detection processing in the detection circuit 9, and these converted signals are output to the arithmetic control circuit 1. The arithmetic control circuit 1 causes an internal timer comprising a counter to measure time intervals from supply of the pulse signal to reception of the vibration arrival timing signals. Furthermore, the arithmetic control circuit 1 calculates the distances between the input pen 3 and the sensors 6a to 6d on the basis of the products of the measured time intervals and the vibration propagating speed, and calculates the position coordinates of the input pen 3 based on the calculated distances using the Pythagorean theorem.

FIG. 10 is a plan view for explaining the arrangement of the vibration transmission plate 8, the sensors 6a to 6d, the vibration suppressors 7a to 7d, and the like. Referring to FIG. 10, the four stripeshaped vibration suppressors 7a to 7d, which extend parallel to the four sides of the vibration transmission plate 8, and are separated from the four sides by a predetermined distance z, are adhered to the rear surface of the input surface of the vibration transmission plate 8, which is subjected to a vibration input operation of the vibration input pen 3, and consists of a substantially rectangular glass plate or the like. The vibration suppressors 7a to 7d are used for suppressing reflection of a vibration by the end faces of the vibration transmission plate, and preventing reverberation. A substantially rectangular input guarantee region A for guaranteeing desired precision or resolution in a calculation of position coordinates (to be described later) is set in a region, surrounded by the vibration suppressors 7a to 7d, on the vibration transmission plate 8. The four vibration sensors 6a to 6d are arranged on the perpendiculars at midpoints of the four sides of the input guarantee region A, and near the input guarantee region A side of the vibration suppressors 7a to 7d, and on the side of the adhesion surface, for the vibration suppressors 7a to 7d, of the vibration transmission plate 8. Conductive portions 83a to 83d allowing electrical connections are arranged on the surface of the vibration transmission plate 8 by means of, e.g., printing, and the sensors 6a to 6d are adhered to the conductive portions 83a to 83d by a conductive adhesive. Each of the sensors 6a to 6d has a columnar shape, and two end faces of each sensor form electrode surfaces. The distances from the respective sides of the input guarantee region A to the sensors 6a to 6d, the distances from the respective sides of the region A to the vibration suppressors 7a to 7d, and the size of the vibration transmission plate 8 are determined on the basis of distance differences between paths of direct waves which are input from the input pen 3 to the sensors along the shortest routes, and paths of reflected waves which are reflected by the end face of the vibration transmission plate 8 or the end faces of the vibration suppressors 7a to 7d, and then reach the sensors, the size of the input guarantee region A, the frequency of an input vibration, the reflectances and attenuation constants of the vibration suppressors 7a to 7d, the widths of the vibration suppressors 7a to 7d, the thickness of the vibration transmission plate 8, the drive condition of the vibrator 4, and performance such as precision or resolution in calculation of position coordinates.

FIGS. 11A and 11B show the details of the sensor 6a. The sensors 6b to 6d have the same arrangement as that of the sensor 6a. Referring to FIGS. 11A and 11B, a metal connection member 106a which allows an electrical connection is pressed, by its own resiliency, against the end face of the sensor 6a opposite to the end face where it is adhered. The connection member 106a is located to extend across the vibration suppressor 7a, and is pressed, by its own resiliency, against a portion (pre-amplifier circuit; to be described later) 82a of the signal detection circuit located on the vibration suppressor 7a. Furthermore, a connection member 107a which consists of a metal plate, and allows electrical connections with the conductive portion 83a and the portion 82a of the detection circuit, is provided. The connection member 107a is urged, by its own resiliency, against the conductive portion 83a and the portion 82a of the detection circuit 82a. The sensor 6a and the detection circuit portion 82a are electrically connected to each other via the conductive portion 83a, the first connection member 106a, and the second connection member 107a.

However, in the above-mentioned prior art, in order to electrically connect the conductive portions 83a to 83d arranged on the vibration transmission plate 8 to the detection circuit 82a, the second connection members 107a to 107d must be arranged near the end faces of the vibration transmission plate 8. For this reason, the size of the vibration transmission plate 8 must be larger than the required minimum size, which is determined by the above-mentioned various conditions, so that the end faces of the vibration transmission plate 8 coincide with the outer end faces of the vibration suppressors 7a to 7d, by a size corresponding to the distance z for arranging the connection members 107a to 107d.

In order to solve the above-mentioned problems, the vibration transmission plate 8 may have projecting portions at only the positions of the connection members 107a to 107d. However, if the vibration transmission plate 8 has a substantially rectangular outer shape, its size becomes larger than the required minimum size, or the vibration transmission plate 8 must have a special shape, resulting in an increase in cost.

In order to solve the above-described problem, as shown in FIG. 12, the vibration suppressors 7a to 7d may be recessed at portions where the connection members 107a to 107d are located, and the connection members 107a to 107d may be arranged in these recessed portions. However, this arrangement, in turn, creates new problems. For example, performance such as precision or resolution deteriorates due to the vibration reflection at these recessed portions. In addition, the vibration suppressors 7a to 7d have complex shapes, resulting in high cost.

Also, in order to solve the above-mentioned problems, the vibration suppressors 7a to 7d may be adhered to the input surface side of the vibration transmission plate 8 opposite to the surface where the sensors 6a to 6d are arranged. However, bulges corresponding to the thickness of the vibration suppressors 7a to 7d are undesirably formed on the input surface side, and disturb the input operation using the Lnput pen while an operator places his or her hand on the vibration transmission plate 8.

SUMMARY OF THE INVENTION

The present invention has been made in consideration of the prior art, and has as its object to provide a compact, inexpensive coordinate input apparatus with good operability.

It is one aspect of the present invention to provide a coordinate input apparatus comprising:

a vibration transmission plate provided with an input guarantee region where a vibration is input from a vibration source;

detection means for detecting a vibration of the vibration transmission plate;

a vibration suppressor which is arranged on a peripheral portion of the vibration transmission plate and along a path of a reflected wave of the vibration input in the input guarantee region to the detection means, and includes a gap for arranging the detection means; and means for calculating coordinates of a position where the vibration is input by the vibration source on the basis of the vibration detected by the detection means.

Preferably, the vibration transmission plate has a substantially rectangular shape, and the detection means is arranged at a corner portion of the vibration transmission plate where the vibration suppressor has a gap.

Preferably, the detection means is arranged at least at three corner portions of the vibration transmission plate.

It is another aspect of the present invention to provide a coordinate input apparatus comprising:

a substantially rectangular vibration transmission plate provided with an input guarantee region where a vibration is input from a vibration source;

vibration detection means arranged at least at three corner portions on the vibration transmission plate;

vibration suppressors which are arranged on a peripheral portion of the vibration transmission plate and along a path of a reflected wave of the vibration input in the input guarantee region to the detection means, and include gaps for arranging the vibration detection means; and means for calculating coordinates of a position where the vibration is input by the vibration source on the basis of the vibration detected by the vibration detection means.

With the above-mentioned arrangement, the coordinate input apparatus according to the present invention can reduce a space for arranging the detection means, and the entire apparatus can be rendered compact. Since the vibration suppressor is located on a path of a reflected vibration, which reaches the detection means, it will not impair coordinate precision. Since the gap for arranging the detection means is present at a corner portion, no special process is required for working.

It is still another aspect of the present invention to provide a coordinate input apparatus comprising:

a vibration transmission plate;

conversion means for detecting a vibration on the vibration transmission plate, and converting the detected vibration into an electrical signal;

amplifier means for amplifying an output signal from the conversion means;

a vibration suppressor arranged on a peripheral portion of the vibration transmission plate; and fixing means for electrically connecting the conversion means and the amplifier means, and fixing the amplifier means on the vibration suppressor at the same time.

Preferably, the fixing means comprises a conductive member formed with opposing pawl portions, connects the conversion means and the amplifier means, and clamps the amplifier means and the vibration transmission plate by the opposing pawl portions.

Preferably, each of the pawl portions of the fixing means is formed in a symmetrical pattern.

It is still another aspect of the present invention to provide a coordinate input apparatus comprising:

a vibration transmission plate;

conversion means for detecting a vibration on the vibration transmission plate, and converting the detected vibration into an electrical signal;

amplifier means for amplifying an output signal from the conversion means;

a vibration suppressor arranged on a peripheral portion of the vibration transmission plate; and connection means, formed with opposing pawl portions consisting of a conductive material, for electrically connecting the conversion means and the amplifier means by clamping the conversion means and the amplifier means by the pawl portions.

With the above-mentioned arrangement, the conversion means and the amplifier means can be easily fixed on the vibration transmission plate. Also, since the fixing member has the pawl portion having a symmetrical shape, it can be commonly used anywhere.

It is still another aspect of the present invention to provide a coordinate input apparatus comprising:

a vibration transmission plate;

generation means for generating a vibration;

intermediate transmission means, pressed against the generation means, for transmitting the vibration;

distal end transmission means, threadably engaged with the intermediate transmission means, for transmitting the vibration to the vibration transmission plate; and means for detecting the vibration transmitted from the distal end transmission means, and calculating coordinates of a vibration input position.

Preferably, the distal end transmission means consists of a resin, and the intermediate transmission means consists of a metal.

Preferably, the generation means converts an input electric power into a mechanical vibration, and the intermediate transmission means also serves as a conductive portion for supplying the electric power to the generation means.

It is still another aspect of the present invention to provide a coordinate input apparatus comprising:

a vibration transmission plate;

generation means for generating a vibration by converting an electric power into a mechanical vibration;

metal intermediate transmission means which is pressed against the generation means to transmit the vibration and the electric power;

resin distal end transmission means, threadably engaged with the intermediate transmission means, for transmitting the vibration to the vibration transmission plate; and means for detecting the vibration transmitted from the distal end transmission means, and calculating coordinates of a vibration input position.

With the above-mentioned arrangement, the distal end transmission means can be easily exchanged. Since the intermediate transmission means consists of a metal, an energy loss is small. Also, since the distal end transmission means consists of a resin, it does not easily wear out. For this reason, a vibration can be stably input.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, FIG. 1 is a plan view for explaining the arrangement of a vibration transmission plate and the like of a coordinate input apparatus according to the first embodiment of the present invention;

FIGS. 2A and 2B are detailed explanatory views of the arrangement of the vibration transmission plate and the like of the coordinate input apparatus according to the first embodiment of the present invention;

DETAILED DESCRIPTION OF THE PREFERRED EMBODIMENTS

FIRST EMBODIMENT

FIGS. 1 to 8 show the first embodiment of a coordinate input apparatus according to the present invention.

Figure 3:
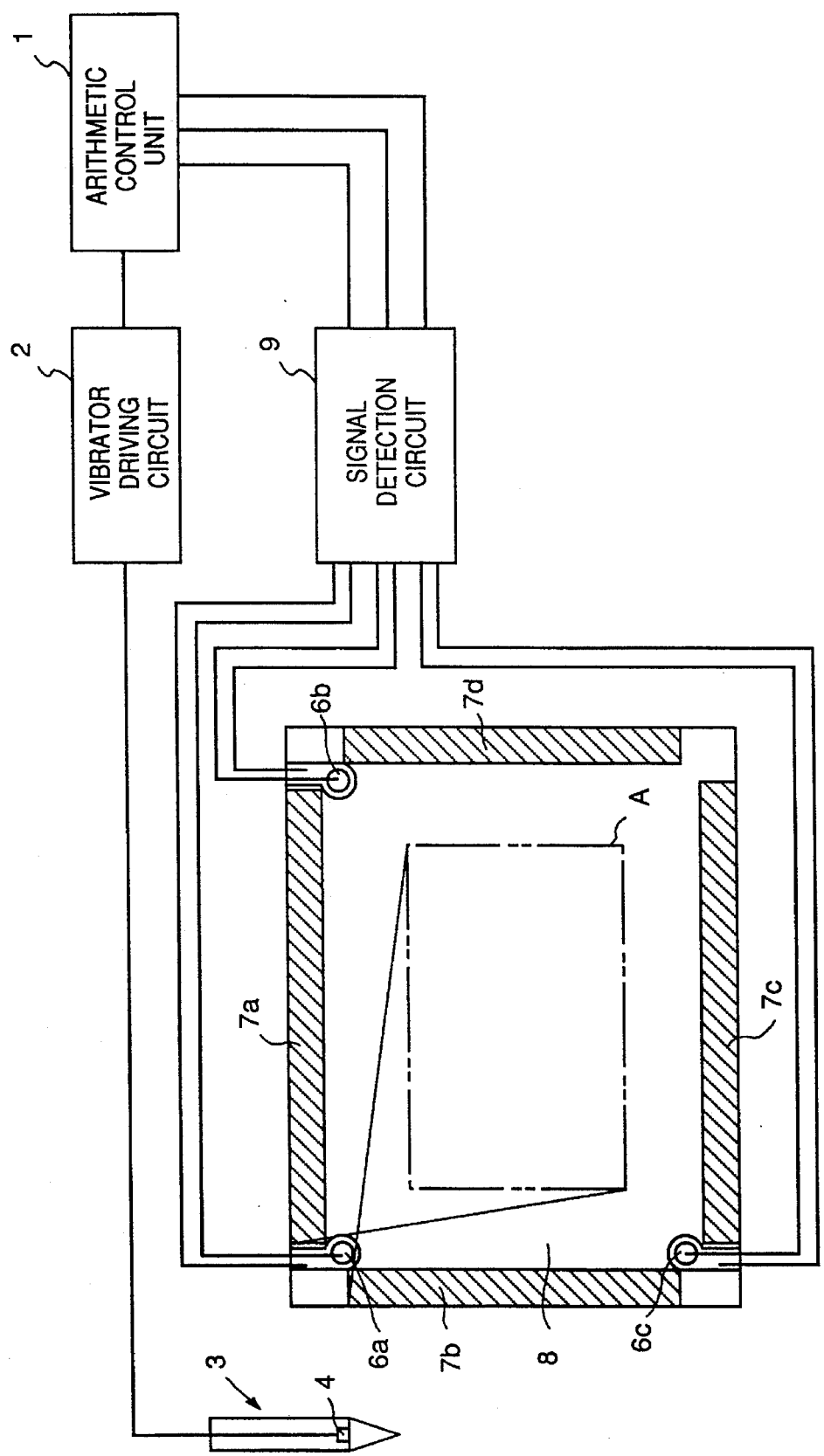
FIG. 3 is a schematic diagram for explaining the coordinate input apparatus according to the first embodiment of the present invention.

FIG. 3 shows a schematic arrangement of the entire coordinate input apparatus of the present invention.

Referring to FIG. 3, the coordinate input apparatus comprises a vibration input pen 3, a vibration transmission plate 8, vibration sensors 6a to 6c, vibration suppressors 7a to 7d, an arithmetic control circuit 1, a vibrator driving circuit 2, and a signal detection circuit 9. More specifically, the arithmetic control circuit 1 for controlling the entire apparatus, and calculating a coordinate position supplies a pulse signal for driving a vibrator 4 incorporated in the input pen 3 to the driving circuit 2. The driving circuit 2 amplifies the pulse signal with a predetermined gain, and supplies the amplified pulse signal to the vibrator 4. The electrical driving signal is converted into a mechanical vibration by the vibrator 4, and is input to the vibration transmission plate 8 via the pen tip of the input pen 3. The input vibration propagates through the vibration transmission plate 8, and reaches the sensors 6a to 6c. The sensors 6a to 6c are sensors such as piezoelectric elements for converting a mechanical vibration into an electrical vibration. The sensors 6a to 6c detect the arrived vibration, and output electrical signals.

The output electrical signals are converted into signal indicating the arrival timings of the vibration to the sensors 6a to 6c by predetermined waveform detection processing in the detection circuit 9, and the converted signals are output to the arithmetic control circuit 1. The arithmetic control circuit 1 causes an internal timer comprising a counter to measure time intervals from supply of the pulse signal to reception of the vibration arrival timing signals, and uses the measured time intervals as vibration propagation times. The distances between the input pen 3 and the sensors 6a to 6c are calculated from products of the vibration propagation times and the vibration propagation speed, and the position coordinates of the input pen 3 are calculated on the basis of the calculated distances using the Pythagorean theorem.

Figure 4:
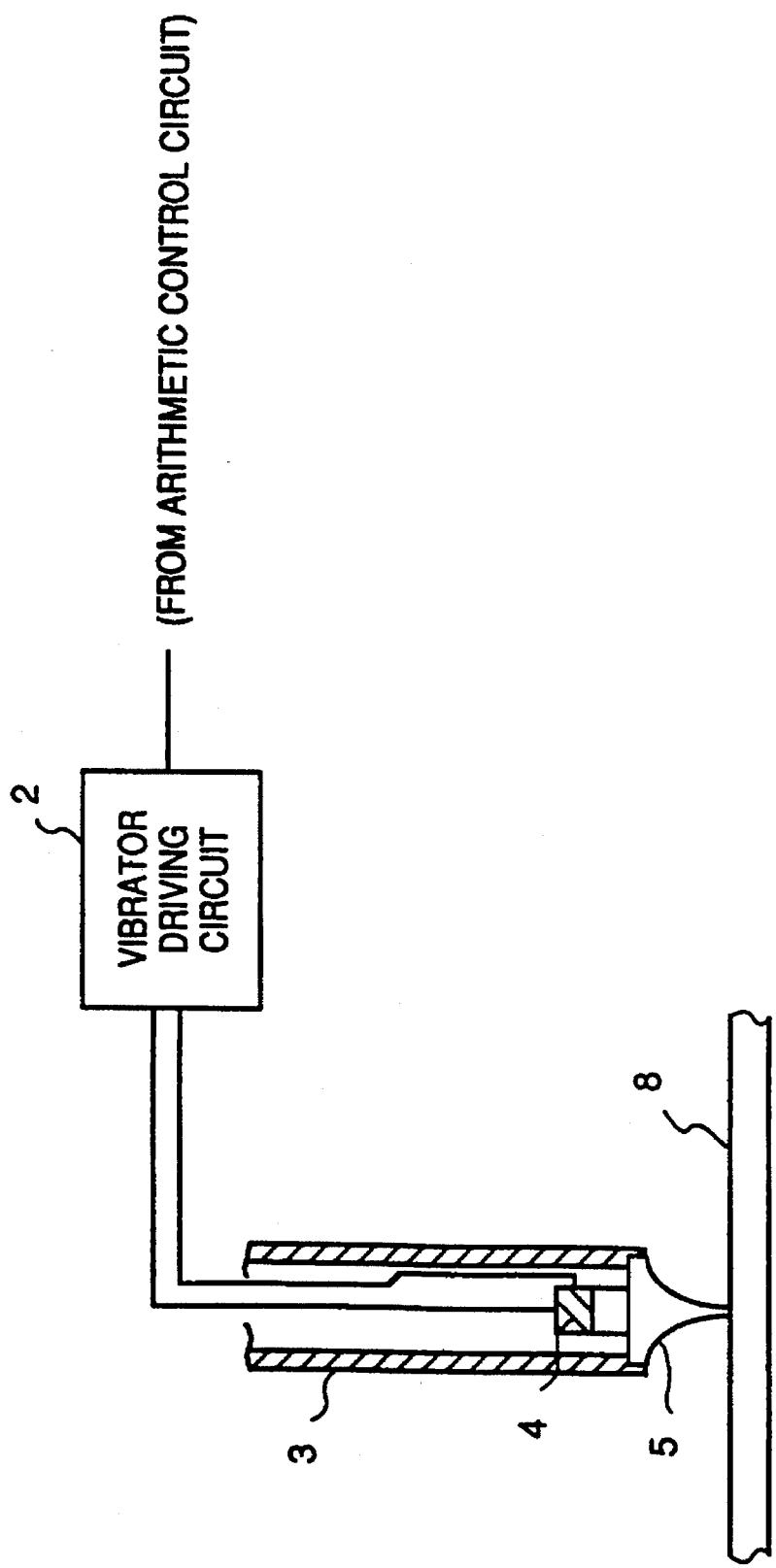
FIG. 4 is a diagram showing a vibration input pen according to the first embodiment of the present invention.

The vibration frequency of the vibrator 4 is selected to be a value capable of generating a Lamb wave in the vibration transmission plate 8 consisting of, e.g., glass. Upon driving of the vibrator, a mode for generating a vibration in a direction perpendicular to the vibration transmission plate 8 in FIG. 4 is selected. Also, when the vibration frequency of the vibrator 4 is selected to be a resonance frequency of a mass including a pen tip 5 of the input pen 3, efficient vibration conversion is assured. An elastic wave transmitted to the vibration transmission plate 8, as described above, is a Lamb wave, and is not easily influenced by scratches, obstacles, and the like on the surface of the vibration transmission plate as compared to a surface wave.

FIG. 1 is a plan view for explaining the arrangement of the vibration transmission plate 8, the sensors 6a to 6c, the vibration suppressors 7a to 7d, and the like. Referring to FIG. 1, the four stripeshaped vibration suppressors 7a to 7d, which extend parallel to the four sides of the vibration transmission plate 8, and are located near the end faces of the four sides, are adhered to the rear surface of the input surface of the vibration transmission plate 8, which is subjected to a vibration input operation of the vibration input pen 3, and consists of a substantially rectangular glass plate or the like. The vibration suppressors 7a to 7d serve as vibration suppression means for suppressing reflection from the end faces of the vibration transmission plate 8, and preventing reverberation. A substantially rectangular input guarantee region A for guaranteeing desired precision or resolution in a calculation of position coordinates (to be described later) is set in a region, surrounded by the vibration suppressors 7a to 7d, on the vibration transmission plate 8. The length, in the longitudinal direction, of each of the vibration suppressors 7a to 7d is smaller than the length of the corresponding side of the vibration transmission plate 8, and is larger than the length of the corresponding side of the input guarantee region A. The three vibration sensors 6a to 6c are arranged outside a region sandwiched by two pairs of substantially parallel lines of infinitely extended lines of the four sides of the input guarantee region A, and near crossing points of extended lines of the end faces, on the side of the input guarantee region A, of the vibration suppressors 7a to 7d, and on the side of the adhesion surface, for the vibration suppressors 7a to 7d, of the vibration transmission plate 8. Conductive portions 83a to 83c which allow electrical connections are formed on the surface of the vibration transmission plate 8 by means of, e.g., printing, and the sensors 6a to 6c are adhered on the conductive portions 83a to 83c by a conductive adhesive. Each of the sensors 6a to 6c has a columnar shape, and two end faces of each sensor form electrode surfaces.

FIGS. 2A and 2B show the details of the sensor 6a. The sensors 6b and 6c have the same arrangement as that of the sensor 6a. Referring to FIGS. 2A and 2B, a metal connection member 109a which allows an electrical connection is pressed, by its own resiliency, against the end face of the sensor 6a opposite to the end face where it is adhered. The connection member 109a is located on a portion of the vibration transmission plate 8 where the vibration suppressors 7a and 7b are not adhered, and is pressed, by its own resiliency, against a pre-amplifier circuit 51 (to be described later) which is also located on a portion of the vibration transmission plate 8 where the vibration suppressors 7a and 7b are not adhered and is a portion of the signal detection circuit 9. Furthermore, a connection member 108a, which consists of a metal plate, and allows electrical connections with the conductive portion 83a and the pre-amplifier circuit 51, is arranged on a portion of the vibration transmission plate 8, where the vibration suppressors 7a and 7b are not adhered. The connection member 108a is pressed, by its own resiliency, against the conductive portion 83a and the pre-amplifier circuit 51. The sensor 6a and the preamplifier circuit 51 are electrically connected to each other via the conductive portion 83a and the connection members 109a and 108a. The sensors 6b and 6c, other than the sensor 6a, have the same arrangement as described above.

In the above-mentioned arrangement, determination of the size of the vibration transmission plate 8 will be described in detail later.

The arithmetic control circuit, detection and correction of the vibration propagation time, and calculation of position coordinates will be described in detail below.

<Arithmetic Control Circuit>

In the above-mentioned arrangement, the arithmetic control circuit 1 outputs a signal for driving the vibrator driving circuit 2 and the vibrator 4 in the vibration input pen 3 every predetermined period (e.g., every 5 ms), and causes its internal timer (comprising a counter) to start time measurement. A vibration generated by the vibration input pen 3 propagates through the vibration transmission plate 8, and reaches the vibration sensors 6a to 6c while being delayed in accordance with the distances thereto.

The signal detection circuit 9 detects signals from the vibration sensors 6a to 6c, and generates signals indicating the vibration arrival timings to the vibration sensors by waveform detection processing (to be described later). The arithmetic control circuit 1 receives the signals in units of sensors, detects the vibration arrival times to the sensors 6a to 6c, and calculates the coordinate position of the vibration input pen 3. The arithmetic control circuit 1 drives a display driving circuit (not shown) on the basis of the calculated position information of the vibration input pen 3 to control a display operation on a display (not shown), and outputs the calculated coordinate position to an external device via a serial or parallel communication.

Figure 5:
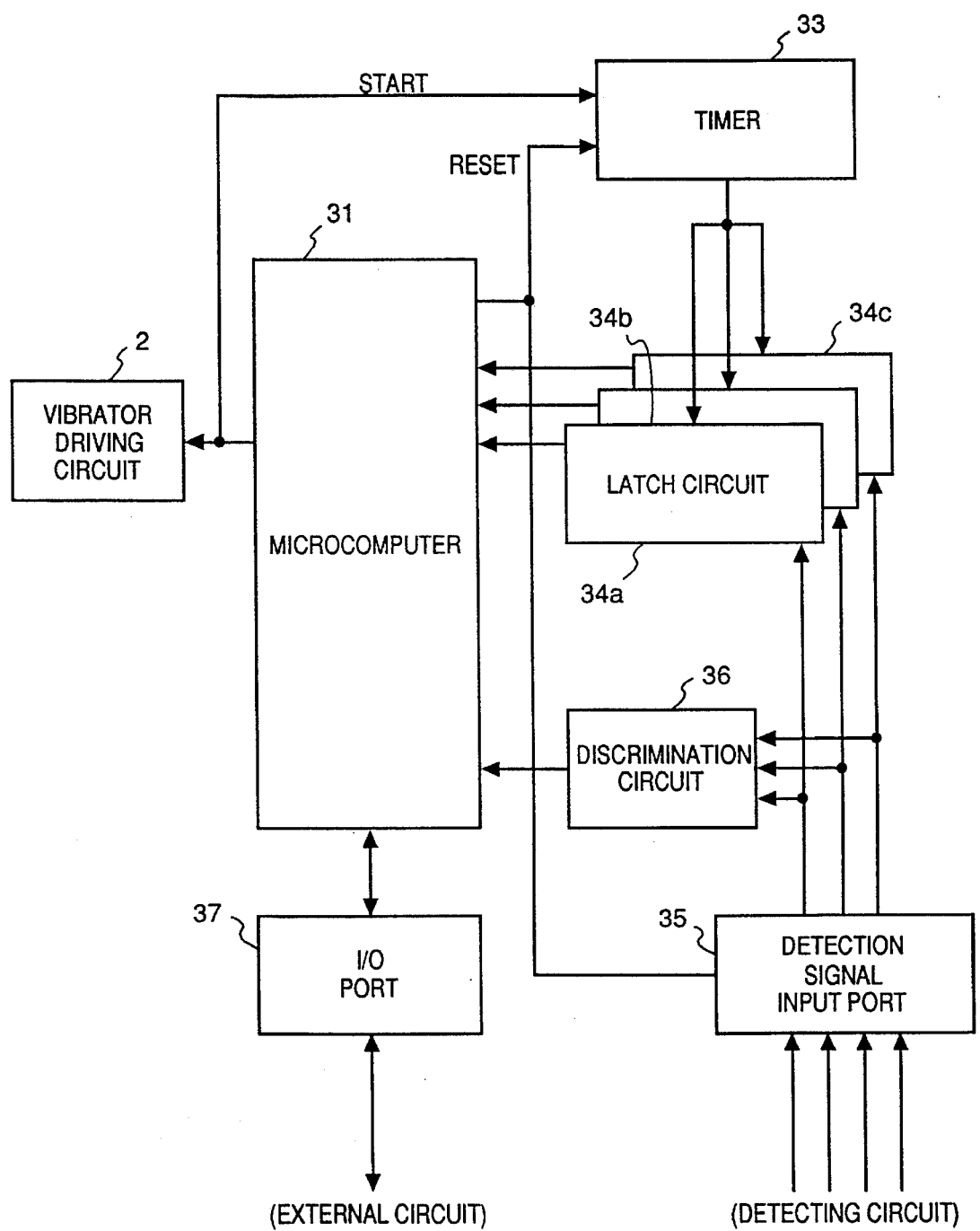
FIG. 5 is a block diagram showing an arrangement of an arithmetic control circuit according to the first embodiment of the present invention.

FIG. 5 is a block diagram showing a schematic arrangement of the arithmetic control circuit 1 of this embodiment. The constituting elements and operation of the arithmetic control circuit 1 will be described below.

Referring to FIG. 5, a microcomputer 31 controls the arithmetic control circuit 1, and the entire coordinate input apparatus of this embodiment. The microcomputer 31 comprises an internal counter, a ROM storing an operation procedure, a RAM used in, e.g., a calculation, a nonvolatile memory for storing, e.g., constants, and the like. A timer 33 comprises, e.g., a counter, and counts reference clocks (not shown). When a start signal for starting the driving operation of the vibrator 4 in the vibration input pen 3 is input to the vibrator driving circuit 2, the timer 33 starts time measurement. Thus, the start timing of time measurement can be synchronized with a vibration detection by the sensors, and the delay times until the sensors 6a to 6c detect a vibration can be measured.

Other circuits as the constituting elements of the arithmetic control circuit 1 will be described in turn.

The vibration arrival timing signals of the sensors 6a to 6c output from the signal detection circuit 9 are input to latch circuits 34a to 34c via a detection signal input port 35. The latch circuits 34a to 34c respectively correspond to the vibration sensors 6a to 6c. Upon reception of the timing signal from the corresponding sensors, each latch circuit latches the time measurement value of the timer 33 at that time. In this manner, when a discrimination circuit 36 discriminates that all the detection signals are received, it outputs a signal indicating this to the microcomputer 31. Upon reception of the signal from the discrimination circuit 36, the microcomputer 31 reads the vibration arrival times to the vibration sensors from the latch circuits 34a to 34c, and calculates the coordinate position of the vibration input pen 3 on the vibration transmission plate 8 by executing a predetermined calculation. When the microcomputer 31 outputs the calculated coordinate position information to a display driving circuit (not shown) via an I/O port 37, for example, a dot can be displayed at the corresponding position on a display (not shown). Alternatively, when the microcomputer 31 outputs the coordinate position information to an interface circuit via the I/O port 37, the coordinate value can be output to an external device.

<Detection of Vibration Propagation Time (FIGS. 6 & 7)>

The principle of measuring the vibration arrival times to the vibration sensors 6a to 6c will be described below.

Figure 6:
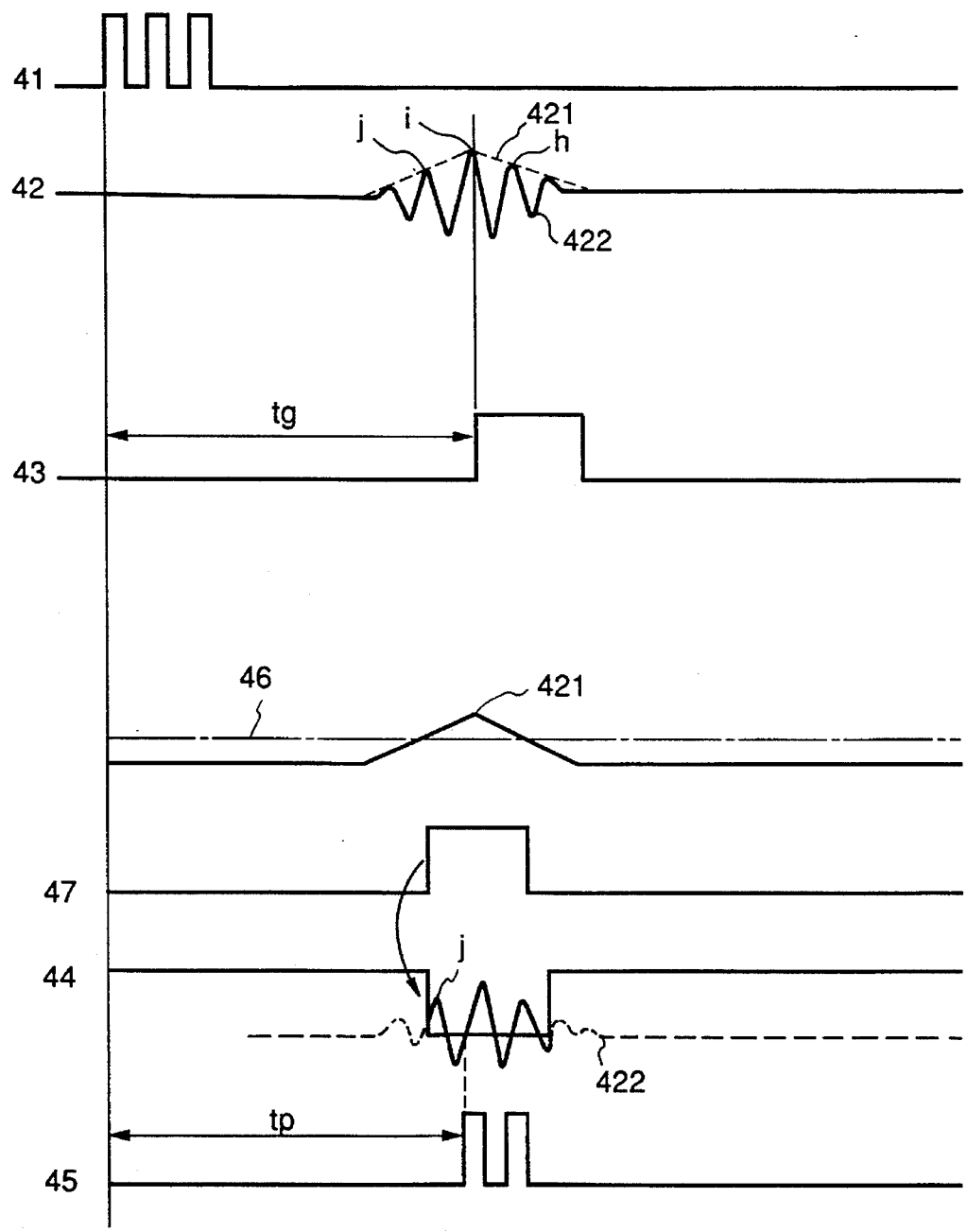
FIG. 6 is a timing chart of signal processing according to the first embodiment of the present invention.

FIG. 6 is a timing chart for explaining a detection waveform input to the signal detection circuit, and measurement processing of the vibration transmission time based on the input waveform. Note that the following description will be made about the vibration sensor 6a, and the same applies to the remaining vibration sensors 6b and 6c. Measurement of the vibration transmission time to the vibration sensor 6a is started simultaneously with the output timing of the start signal to the vibrator driving circuit 2, as has been described above. At this time, the vibrator driving circuit 2 supplies a driving signal 41 to the vibrator 4. A vibration transmitted from the vibration input pen 3 to the vibration transmission plate 8 in response to this signal 41 propagates for a time tg according to the distance to the vibration sensor 6a, and thereafter, is detected by the vibration sensor 6a.

A waveform 42 shown in FIG. 6 corresponds to a signal waveform detected by the vibration sensor 6a. Since the vibration used in this embodiment is a Lamb wave, the relationship between an envelope 421 and a phase 422 of the detection waveform changes in correspondence with the propagaeion distance in the vibration transmission plate 8. Assume that the propagation velocity, i.e., the group velocity of the envelope 421 is represented by Vg, and the phase velocity of the phase 422 is represented by Vp. The distance between the vibration input pen 3 and the vibration sensor 6a can be detected based on the group velocity Vg and the phase velocity Vp.

Paying attention to the envelope 421 alone, its velocity is Vg, and when a peak is detected at a certain point (e.g., an inflection point) on a specific waveform or as in a signal indicated by a waveform 43, the distance between the vibration input pen 3 and the vibration sensor 6a is given by:

$$d = Vg \cdot tg \quad (1)$$

where tg is the vibration. transmission time. Although this equation is associated with the vibration sensor 6a alone, the distance between each of the remaining two vibration sensors 6b and 6c and the vibration input pen 3 can be expressed by the same equation.

Furthermore, in order to determine coordinates with higher precision, processing based on detection of a phase signal is executed. If a time interval from a specific detection point (e.g., a vibration application point) of the phase waveform signal 422 to a zero-crossing point after a predetermined signal level 46 is represented by tp 45 (obtained by generating a window signal 44 having a predetermined width in a signal 47, and comparing it with the phase signal 422), the distance between the vibration sensor 6a and the vibration input pen 3 is given by:

$$d = n \cdot \lambda p + Vp \cdot tp \quad (2)$$

where λp is the wavelength of the elastic wave, and n is an integer.

From equations (1) and (2) above, the integer n is expressed by:

$$n = int[(Vg \cdot tg - Vp \cdot tp)/\lambda p + 1/N] \quad (3)$$

where N is a real number other than 0, and assumes a proper value. For example, if N=2, n can be determined even if tg or the like varies within a range of ±½ wavelength. When n determined as described above is substituted in equation (2), the distance between the vibration ihput pen 3 and the vibration sensor 6a can be measured with high precision. The signals 43 and 45 used in measurement of the above-mentioned two vibration transmission times tg and tp are generated by the signal detection circuit 9. The signal detection circuit 9 has an arrangement, as shown in FIG. 7.

Figure 7:
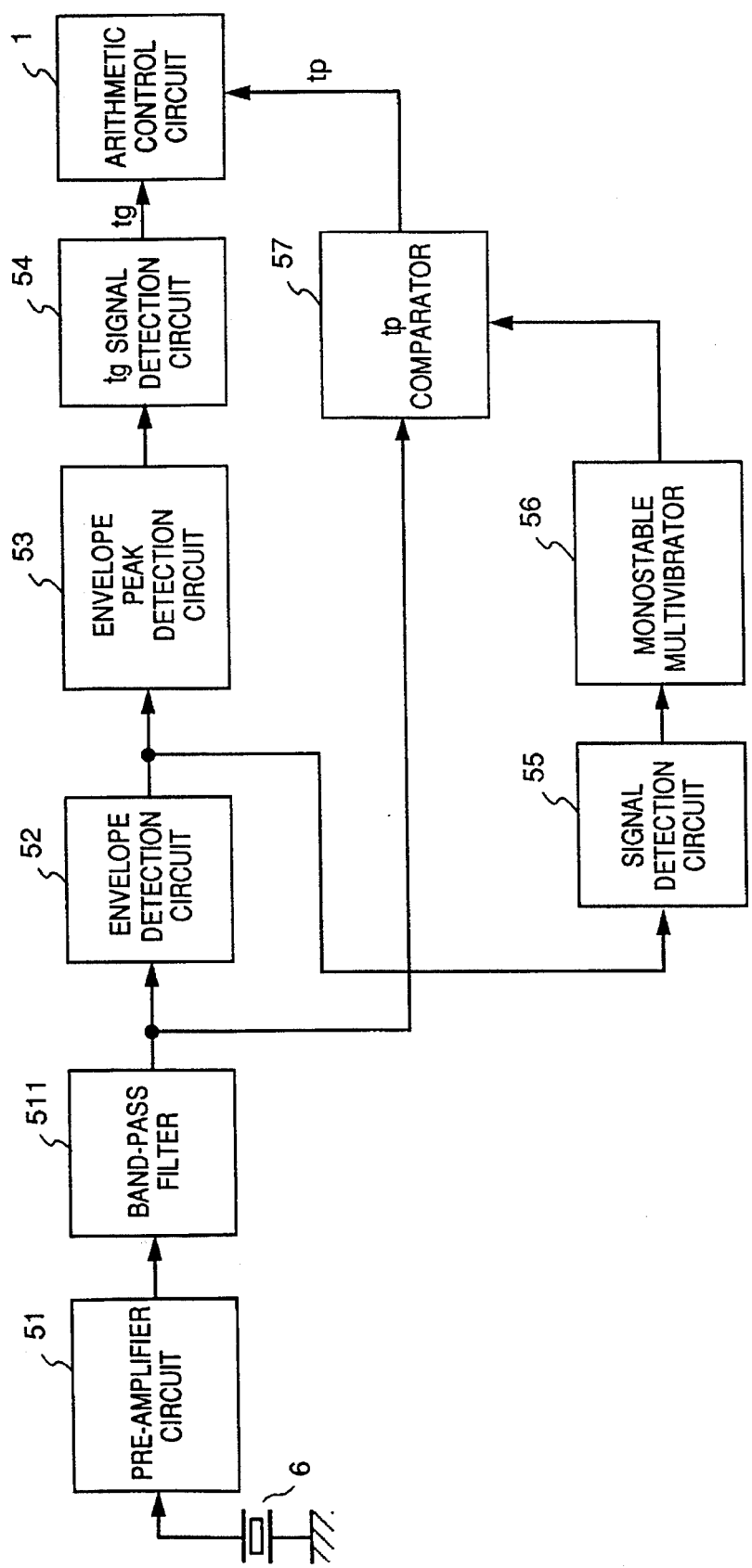
FIG. 7 is a block diagram showing an arrangement of a signal detection circuit according to the first embodiment of the present invention.

FIG. 7 is a block diagram showing an arrangement of the signal detection circuit 9 of this embodiment. Referring to FIG. 7, the output signal from the vibration sensor 6a is amplified to a predetermined level by the pre-amplifier circuit 51. The amplified signal is supplied to a band-pass filter 511 to remove unnecessary frequency components of the detection signal. The signal is then input to an envelope detection circuit 52 comprising, e.g., an absolute value circuit, a low-pass filter, and the like, and the envelope alone of the detection signal is extracted from the input signal. The timing of an envelope peak is detected by an envelope peak detection circuit 53. The output signal from the peak detection circuit is input to a tg signal detection circuit 54 comprising, e.g., a monostable multivibrator, and a signal tg (a signal 43 in FIG. 5) as an envelope delay time detection signal having a predetermined waveform is formed by the circuit 54. The signal tg is then input to the arithmetic control circuit 1.

On the other hand, a signal detection circuit 55 forms a pulse signal 47 corresponding to a portion, exceeding a threshold signal 46 having a predetermined level, in the envelope signal 421 detected by the envelope detection circuit 52. A monostable multivibrator 56 enables the gate signal 44 having a predetermined time width, which signal is triggered by the first leading edge of the pulse signal 47. A tp comparator 57 detects the zero-crossing point of the first leading edge of the phase signal 422 while the gate signal 44 is enabled, and supplies the phase delay time signal tp 45 to the arithmetic control circuit 1. The above-mentioned circuits correspond to the vibration sensor 6a, and the same circuits are provided to other vibration sensors.

<Correction of Delay Time>

Figure 8:
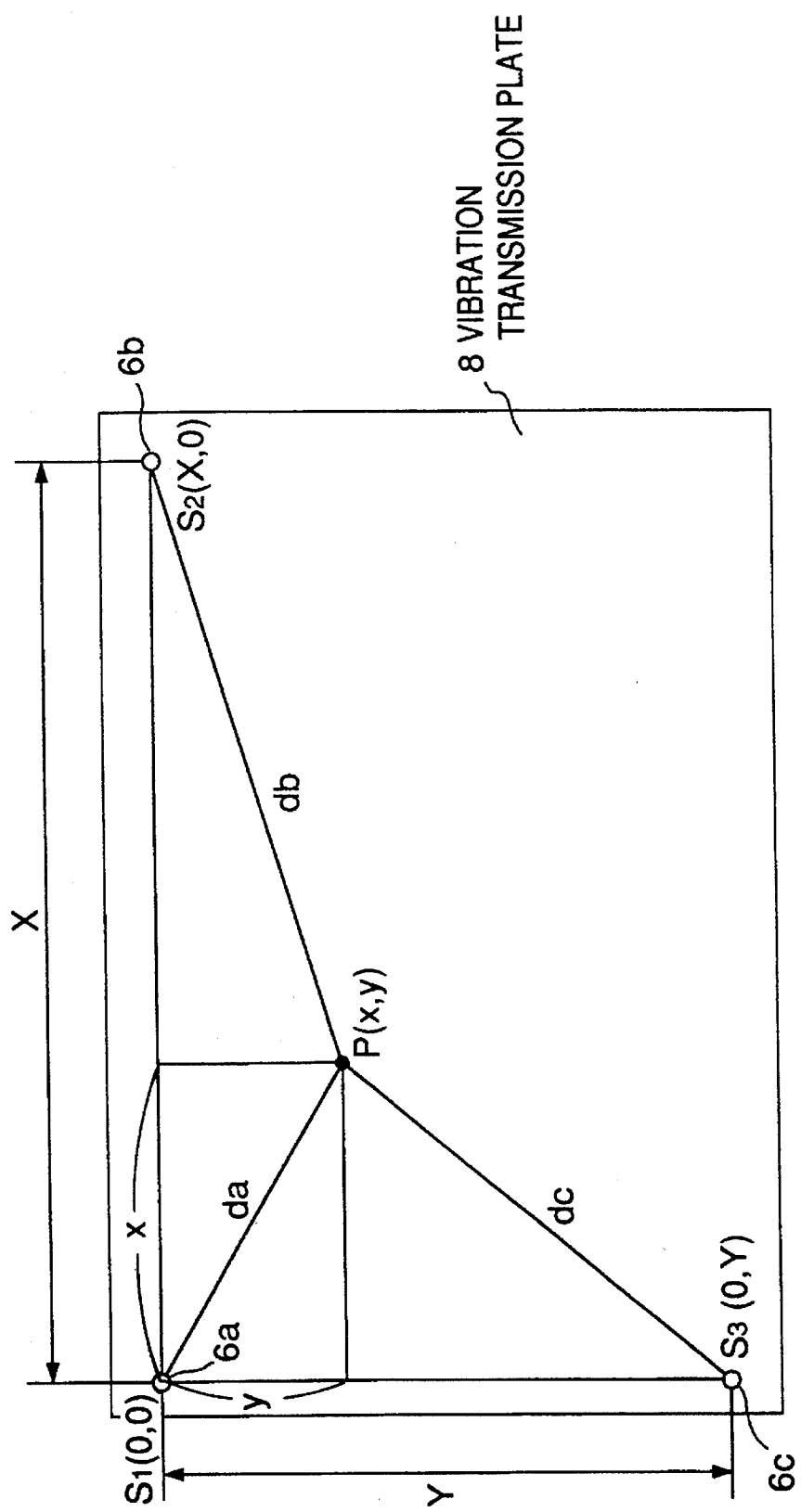
FIG. 8 is an explanatory view for a coordinate position calculation according to the first embodiment of the present invention.
Figure 9:
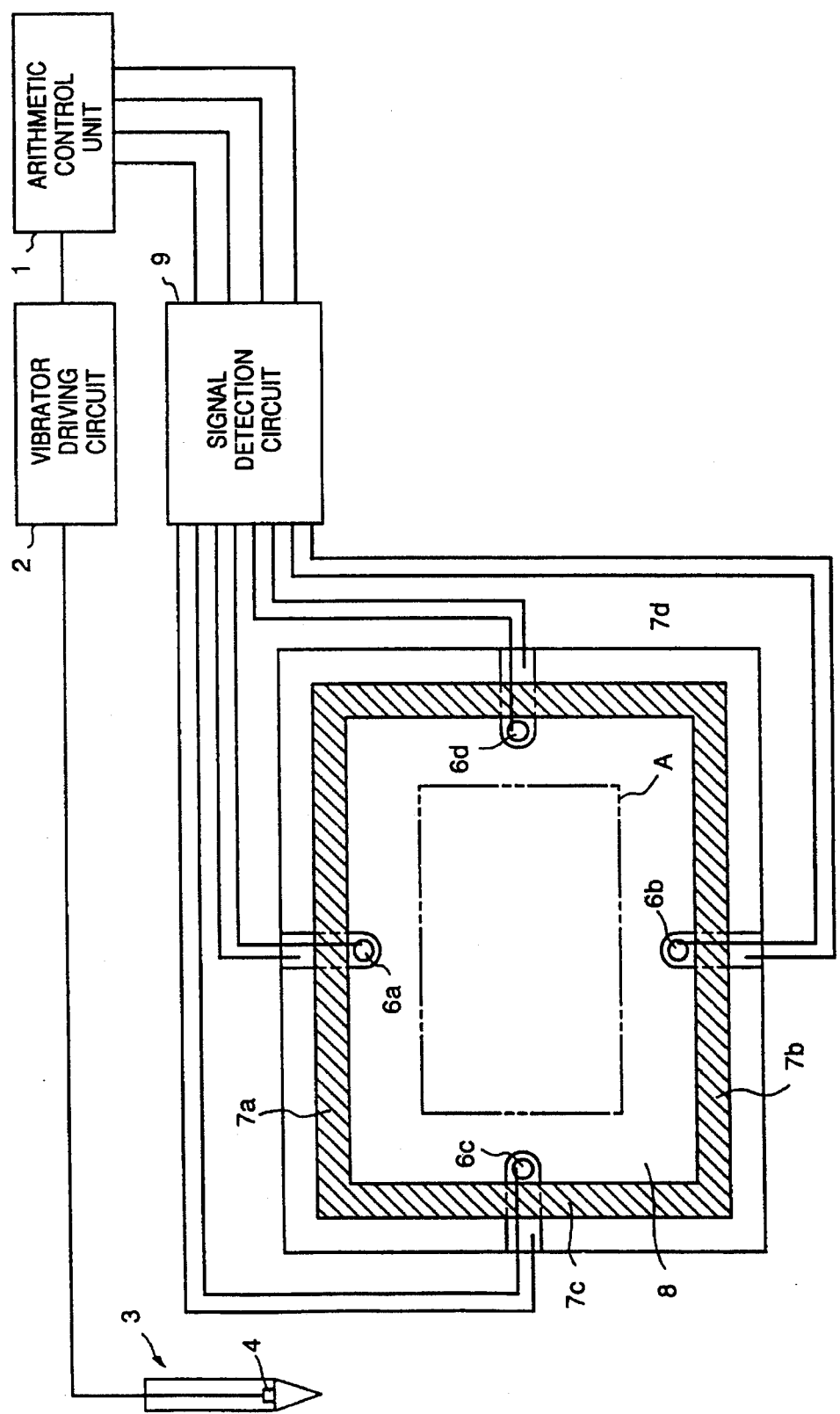
FIG. 9 is a schematic diagram for explaining an arrangement of a vibration transmission plate and the like of a conventional coordinate input apparatus.
Figure 10:
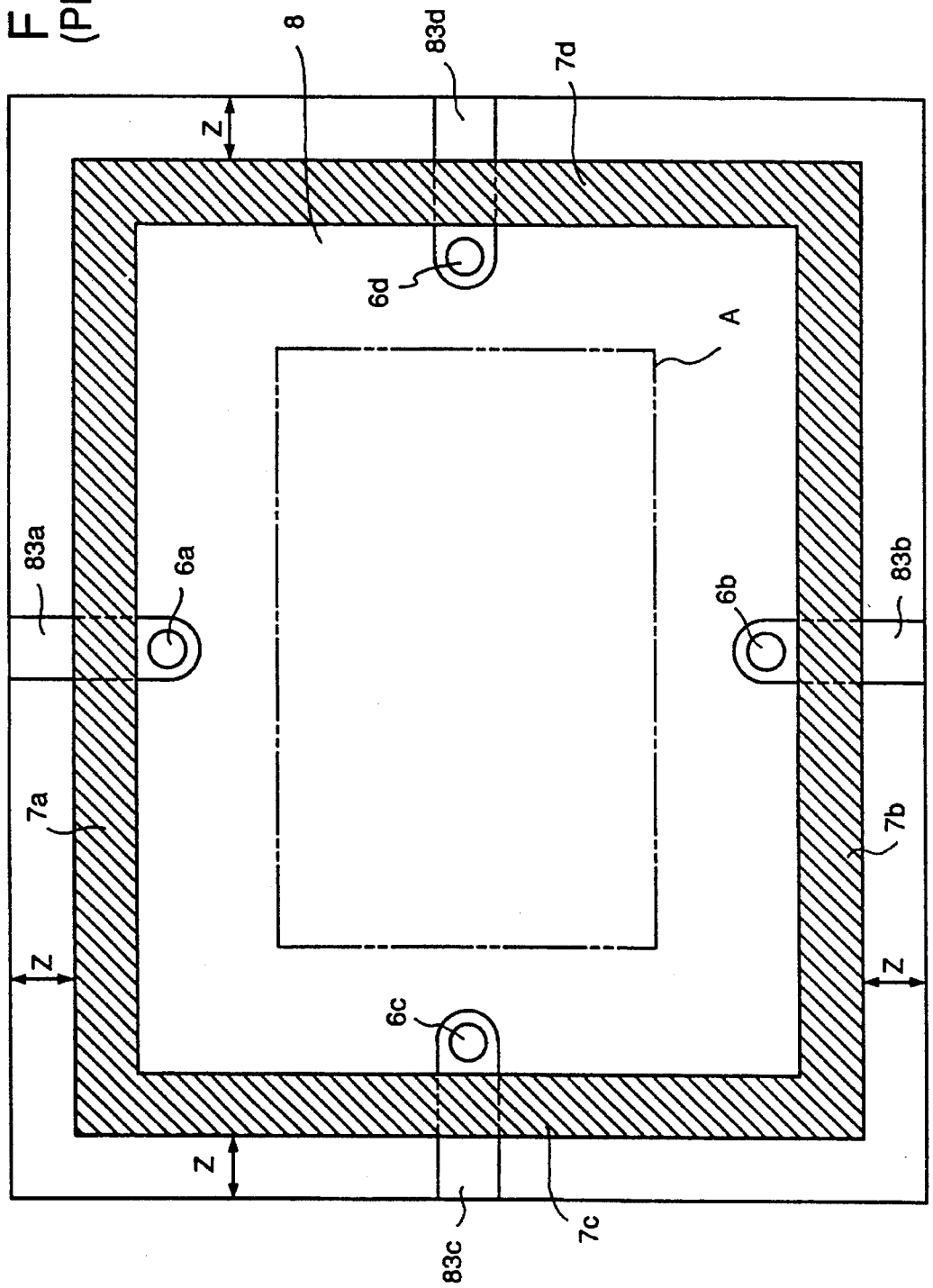
FIG. 10 is a plan view for explaining the arrangement of the vibration transmission plate and the like of the conventional coordinate input apparatus.
Figure 11B:
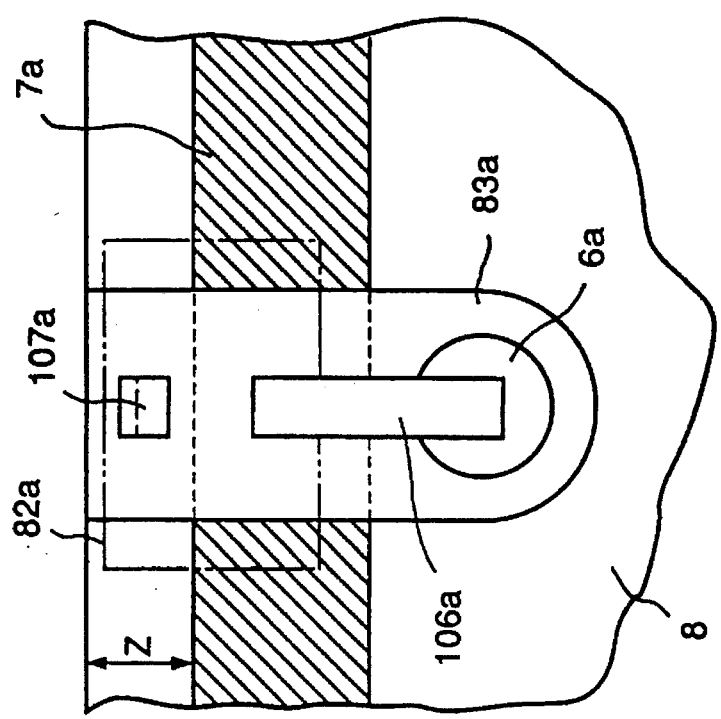
FIGS. 11A and 11B are detailed explanatory views of the arrangement of the vibration transmission plate and the like of the conventional coordinate input apparatus.
Figure 11A:
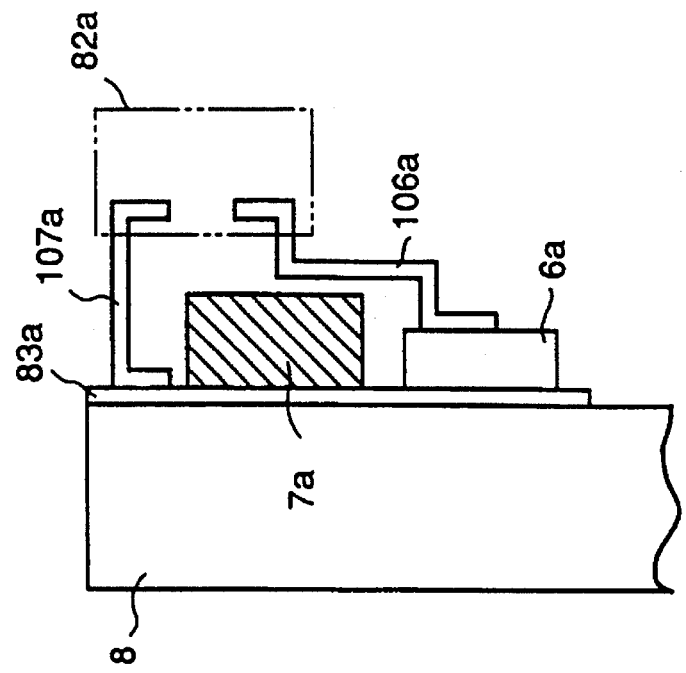
Figure 12:
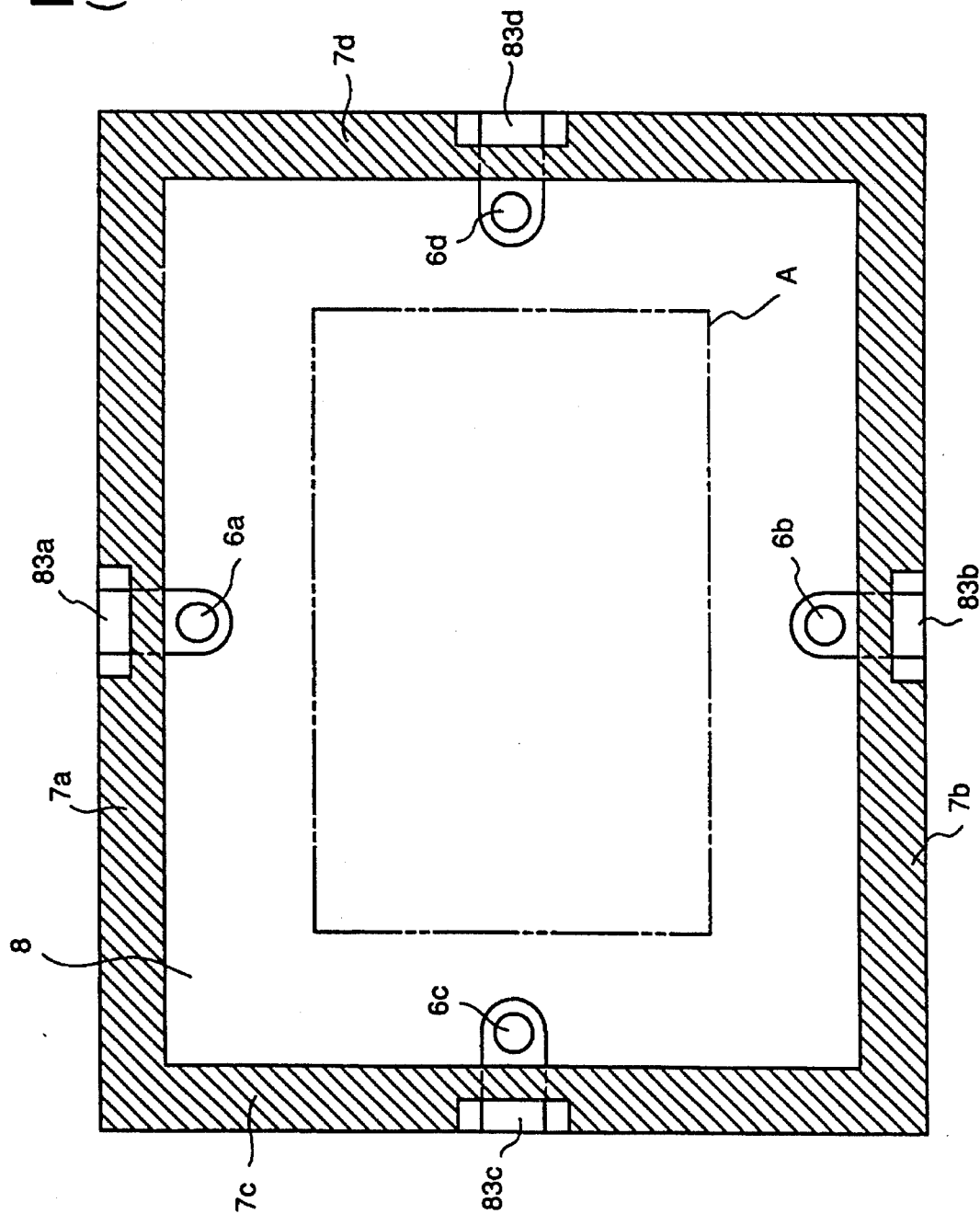
FIG. 12 is a plan view for explaining another arrangement of the vibration transmission plate and the like of the conventional coordinate input apparatus.

Strictly speaking, the vibration transmission time latched by each latch circuit includes a propagation time of a sonic wave in the pen tip of the input pen 3, and a time required for processing the signals output from the sensors 6a to 6c by the above-mentioned circuit. Thus, these delay times other than the propagation time of the wave on the vibration transmission plate 8 are defined as an intrinsic delay time et. In addition, a difference between a group delay time and a phase delay time at a reference point is defined as a phase offset time toff. The same amount of an error caused by these delay times is always included in vibration transmission from the vibration input pen 3 to the vibration sensors 6a to 6c via the vibration transmission plate 8. Thus, when the position of the origin O in FIG. 8 is defined as the above-mentioned reference point, and the distance to the vibration sensor 6a is represented by R1(=X/2), if the input operation is performed by the vibration input pen 3 at the origin O, the actually measured vibration transmission times from the origin O to the sensor 6a are represented by tgz' and tpz', and the true transmission time from the origin O to the sensor are represented by tgz and tpz, these times satisfy the following relationships in association with the intrinsic delay time et and the phase offset toff:

$$tgz' = tgz + et \quad (4)$$

$$tpz' = tpz + et + toff \quad (5)$$

On the other hand, actually measured values tg' and tp' at an arbitrary input point P are similarly given by:

$$tg' = tg + 35 \quad (6)$$

$$tp' = tp + 35 + toff \quad (7)$$

When differences between equations (4) and (6), and between equations (5) and (6) are calculated, we have:

$$tg' - tgz' = (tg + et) - (tgz + et) = tg - tgz \quad (8)$$

$$tp' - tpz' = (tp + et + toff) - (tpz + et + toff) = tp - tpz \quad (9)$$

Therefore, the intrinsic delay time et and the phase offset toff included in these transmission times are removed, and a difference between the true transmission delay times according to the distance having the position of the sensor 6a as the start point between the position of the origin O and an input point P can be obtained. When equations (2) and (3) are used, the distance difference can be calculated. Since the distance from the sensor 6a to the origin O is prestored in, e.g., the nonvolatile memory, and is already known, the distance between the vibration input pen 3 and the vibration sensor 6a can be determined. The same applies to other sensors 6b and 6c. The actually measured values tgz' and tpz' at the origin O are prestored in the nonvolatile memory, and equations (8) and (9) are executed before calculations of equations (2) and (3), thus achieving measurement with high precision.

<Calculation of Coordinate Position (FIG. 8)>

The principle of actual coordinate position detection on the vibration transmission plate 8 by the vibration input pen 3 will be described below.

When the three vibration sensors 6a to 6c are arranged at positions S1 to S3 (FIG. 8) near the four corner portions on the vibration transmission plate 8, linear distances da to dc from a position P of the vibration input pen 3 to the vibration sensors 6a to 6c can be calculated on the basis of the above-mentioned principle. Furthermore, the arithmetic control circuit 1 calculates coordinates (x, y) of the position P of the vibration input pen 3 on the basis of these linear distances da to dc using the Pythagorean theorem as follows:

$$x = (da + db) \cdot (da - db)/2X \quad (10)$$

$$y = (dc + da) \cdot (dc - da)/2Y \quad (11)$$

where X and Y are respectively the distance between the vibration sensors 6a and 6b, and the distance between the vibration sensors 6c and 6a.

As described above, the position coordinates of the vibration input pen 3 can be detected in real time.

Determination of the size of the vibration transmission plate 8 according to the present invention will be described below.

In detection of the vibration propagation time, the detection waveform is preferably a direct wave obtained when a vibration input from the input pen 3 reaches the sensors 6a to 6d along the shortest route. This is because when reflected waves, which are reflected by the end face of the vibration transmission plate 8 or the end faces of the vibration suppressors 7a to 7d, and then reach the sensors 6a to 6c, interfere with the detection points of the detection waveform, the waveform is deformed, and the vibration transmission times tg and tp undesirably include an error. This error causes an error in calculations of the distances between the input pen 3 and the sensors 6a to 6c using equation (1) or equations (2) and (3), and hence, causes an error in calculations of the position coordinates of the input pen 3 using equations (10) and (11). In other words, this error impairs performance such as precision or resolution. For this reason, the sensors 6a to 6c and the vibration suppressors 7a to 7d are arranged to be separated from the input guarantee region A by a predetermined distance, so that reflected waves reach the sensors 6a to 6c after an elapse of a predetermined delay time, i.e., the paths of the reflected waves become longer by a predetermined distance by the path of the direct wave. However, when an arrangement for allowing reflected waves to reach the sensors 6a to 6c to be sufficiently delayed from the direct wave is adopted, the distances between the input guarantee region A and the sensors 6a to 6c, and the vibration suppressors 7a to 7d, and the widths of the vibration suppressors increase, and the size of the vibration transmission plate 8 increases. For this reason, the size of the vibration transmission plate 8 is determined in such a manner that the sensors 6a to 6c, and the vibration suppressors 7a to 7d are arranged with respect to the input guarantee region A so as to allow interference of reflected waves which cause an error in the vibration arrival times tg and tp within an allowable range of required performance such as precision or resolution of the coordinate input device of the present invention. The determination is made by experiments or simulations in association with the allowable value of performance such as precision or resolution, the size of the input guarantee region A, the path difference between direct and reflected waves, the attenuation constant of a vibration upon propagation in the vibration transmission plate 8, the attenuation constant of a vibration upon propagation in the adhered portions of the vibration suppressors 7a to 7d, the widths of the vibration suppressors 7a to 7d, the reflectances at the end faces of the vibration suppressors 7a to 7d, the reflectances at the end faces of the vibration transmission plate 8, the frequency of an input vibration, the thickness of the vibration transmission plate 8, the driving condition of the vibrator 4, and the like. The experiments or simulations are made near the four sides of the input guarantee region A and in the input guarantee region A where the path difference between the direct and reflected waves becomes small.

The lengths, in the longitudinal direction, of the vibration suppressors 7a to 7d in the above determination will be described below. As described above, the length, in the longitudinal direction, of each of the vibration suppressors 7a to 7d is smaller than the length of the corresponding side of the vibration transmission plate 8, and is larger than the length of the corresponding side of the input guarantee region A, as has been described above. The sensors 6a to 6c are arranged outside a region sandwiched by two pairs of substantially parallel lines of infinitely extended lines of the four sides of the input guarantee region A, and near crossing points of extended lines of the end faces, on the side of the input guarantee region A, of the vibration suppressors 7a to 7d.

In the above-mentioned arrangement, a vibration input from an arbitrary position on the input guarantee region A is reflected by the end face of the vibration transmission plate 8 corresponding to the vibration suppressor 7a. The end face, in the widthwise direction on the side of the sensor 6a, of the vibration suppressor 7a is located, so that paths of a wave reflected by the end face of the vibration transmission plate 8 to the sensors 6a and 6c always pass the vibration suppressor 7a. In other words, the vibration suppressor 7a need not be present at the side closer to the corner portion of the vibration transmission plate 8 than the position of the end face of the vibration suppressor 7a in FIG. 1. Also, the position of the end face of the vibration suppressor 7a is calculated by a simple mathematical calculation on the basis of the reflected wave of a vibration input at a corner portion, on the side of the vibration suppressor 7b and far from the sensor 6a, of the input guarantee region A. At this time, a wave which is reflected twice or more can be ignored since the phase difference between the direct and reflected waves can be sufficiently large. The above description have been made above the end face, at the side of the sensor 6a, of the vibration suppressor 7a, and the same applies to all the end faces of the vibration suppressors 7a to 7d. More specifically, the length, in the longitudinal direction, of each of the vibration suppressors 7a to 7d is smaller than the length of the corresponding side of the vibration transmission plate 8, and is larger than the length of the corresponding side of the input guarantee region A. Also, the sensors 6a to 6c are arranged outside a region sandwiched by two pairs of substantially parallel lines of infinitely extended lines of the four sides of the input guarantee region A, and near crossing points of extended lines of the end faces, on the side of the input guarantee region A, of the vibration suppressors 7a to 7d. In this manner, one of the vibration suppressors 7a to 7d is always present along the path of a wave which is reflected by a certain end face of the vibration transmission plate 8, and reaches one of the sensors 6a to 6d. For this reason, with the above-mentioned arrangement, since the lengths of the vibration suppressors can be properly set upon determination of the size of the vibration transmission plate 8, the minimum required size of the vibration transmission plate 8 can be obtained in the determination.

In this embodiment, the vibration transmission plate 8 consists of glass. However, the present invention is not limited to this, and any other materials may be used as long as they can transmit a vibration.

The vibration transmission plate 8 has substantially the rectangular shape. However, the corner portions of the rectangle may be chamfered or processed to have a certain radius within a range wherein a required path difference between the direct and reflected waves is assured.

The sensors 6a to 6c have the columnar shape. However, the present invention is not limited to this. For example, the sensors may have any other shapes such as a prism shape, a cylindrical shape, and the like as long as they can detect a vibration.

The sensors 6a to 6c are arranged near the crossing points of the end faces, in the longitudinal direction on the side of the input guarantee region, of the vibration suppressors 7a to 7d. However, the present invention is not limited to this. The sensors 6a to 6c may be arranged anywhere as long as they are located outside a region sandwiched by two pairs of substantially parallel lines of infinitely extended lines of the four sides of the input guarantee region, and near the extended lines of the end faces, on the side of the input region A, of the vibration suppressors 7a to 7d.

The sensors 6a to 6c are adhered to the vibration transmission plate 8. Alternatively, the sensors may be pressed against the vibration transmission plate 8.

The number of vibration sensors is 3. However, the present invention is not limited to this. For example, two sensors, or four or more sensors may be arranged as needed.

In the above description, each of the vibration suppressors 7a to 7d has a substantially rectangular shape. However, the present invention is not limited to this. For example, each vibration suppressor may have any shapes such as a shape having a three-dimensional pattern in its longitudinal direction, a shape having a gradient in its longitudinal direction, a shape having a gradient in its widthwise direction, or the like as long as it can exhibit a predetermined anti-vibration effect.

The vibration suppressors 7a to 7d are adhered to the rear surface of the input surface of the vibration transmission plate 8, but may be adhered to the input surface side, as needed. In this case, the antivibration effect is enhanced.

The sensors 6a to 6c and the vibration suppressors 7a to 7d are arranged on the rear surface of the input surface of the vibration transmission plate 8, but may be arranged on the input surface side. Some of the sensors 6a to 6c and the vibration suppressors 7a to 7d may be arranged on the input surface side, as needed. In this case, for example, when a display is arranged below the vibration transmission plate 8, the degree of freedom of the arrangement can be increased.

The conductive portion 83a (83b, 83c), which is one of electrical connection means between one electrode of the sensor 6a (6b, 6c) and the signal detection circuit 9 and is formed by printing on the vibration transmission plate 8, is not limited to the above-mentioned arrangement. For example, the conductive portions 83a to 83c may be planar members which are fixed onto the vibration transmission plate 8 by adhesion or pressing. Furthermore, the metal connection member 108a (108b, 108c) as another electrical connection means between the electrode of the sensor 6a (6b, 6c) and the signal detection circuit 9 is not limited to the arrangement of the first embodiment, and any other electrical connection means such as a lead wire may be employed as long as it can electrically connect between the conductive portion 83a (83b, 83c) and the signal detection circuit 9.

As described above, the size of the vibration transmission plate is determined on the basis of differences between paths of direct waves which are input from the input pen to the sensors along the shortest routes, and paths of reflected waves which are reflected by the end face of the vibration transmission plate or the end faces of the vibration suppressors, and then reach the sensors, the size of the input guarantee region A, the frequency of an input vibration, the reflectances and attenuation constants of the vibration suppressors, the widths of the vibration suppressors, the thickness of the transmission plate, the driving condition of the vibrator, performance such as precision or resolution required in position coordinate calculations, and the like. The coordinate input apparatus with the arrangement of this embodiment comprises a plurality of stripe-shaped vibration suppression means which are arranged on a vibration transmission plate near the four end faces of the vibration transmission plate, and the length, in the longitudinal direction, of each vibration suppression means is set to be smaller than the length of the corresponding side of the vibration transmission plate and to be larger than the length of the corresponding side of the input guarantee region. For this reason, the transmission plate can have a required minimum size, and a low-cost, high-performance coordinate detection apparatus can be realized.

Furthermore, the sensors comprise mechano-electrical conversion elements arranged on the surface of the vibration transmission plate, first electrical connection means are arranged on the surface of the vibration transmission plate as one of electrical connection means between the electrodes of the sensors and the arithmetic means, and second electrical connection means are located near the end faces of the vibration transmission plate and on regions where the vibration suppression means are not arranged, so that a portion of the arithmetic means (the pre-amplifier circuit as a portion of the signal detection circuit) can be arranged near the transmission plate surface without interfering with the vibration suppression means, thus realizing a low-profile coordinate detection apparatus.

[SECOND EMBODIMENT]

As the second embodiment of the present invention, a coordinate input apparatus will be described below as in the first embodiment.

In a coordinate input apparatus using an elastic wave, as described in the first embodiment, an electrode member connected to each sensor electrode is fixed by a member such as a screw, soldering, or the like.

Figure 14:
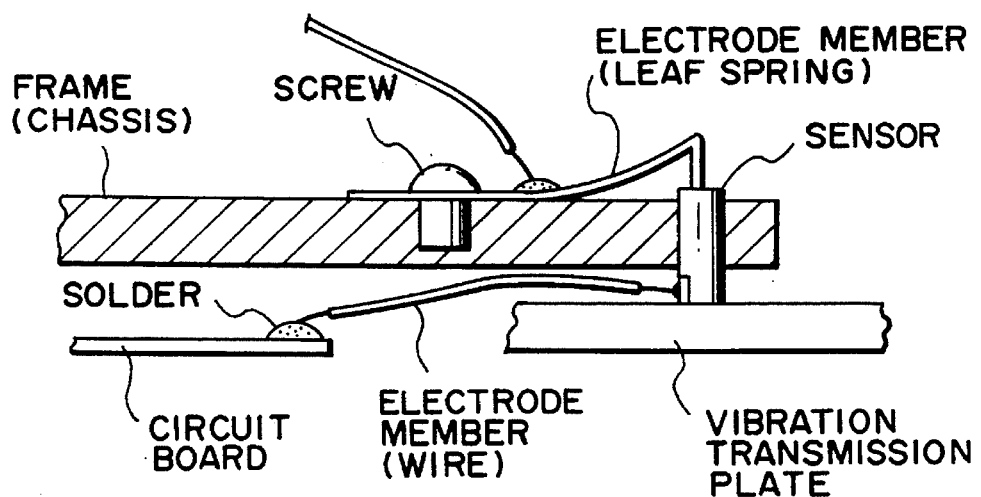
FIG. 14 is a sectional view for explaining an arrangement around a vibration sensor of the coordinate input device of the second embodiment.

However, in the apparatus with this arrangement, since the electrode member connected to the sensor electrode is fixed by, e.g., a screw, soldering, or the like, as shown in FIG. 14, the arrangement of the apparatus becomes large in size, the number of processes required for fixing the electrode member is undesirably increased, or an extra space for fixing the electrode member is required. These problems raise the manufacturing cost of the apparatus.

Furthermore, a circuit board portion on which circuits such as an amplifier, and the like are arranged are fixed to a member different from the vibration transmission plate as the coordinate input surface. For this member, extra processes for arranging the circuit board, and an extra space for fixing the circuit board are required, resulting in a bulky apparatus and an increase in manufacturing cost.

In this embodiment, a coordinate input apparatus which can solve these problems will be described below.

<Structure a coordinate input apparatus>

FIG. 13 and FIGS. 15 to 18 show an arrangement of a coordinate input apparatus according to the second embodiment.

Figure 13:
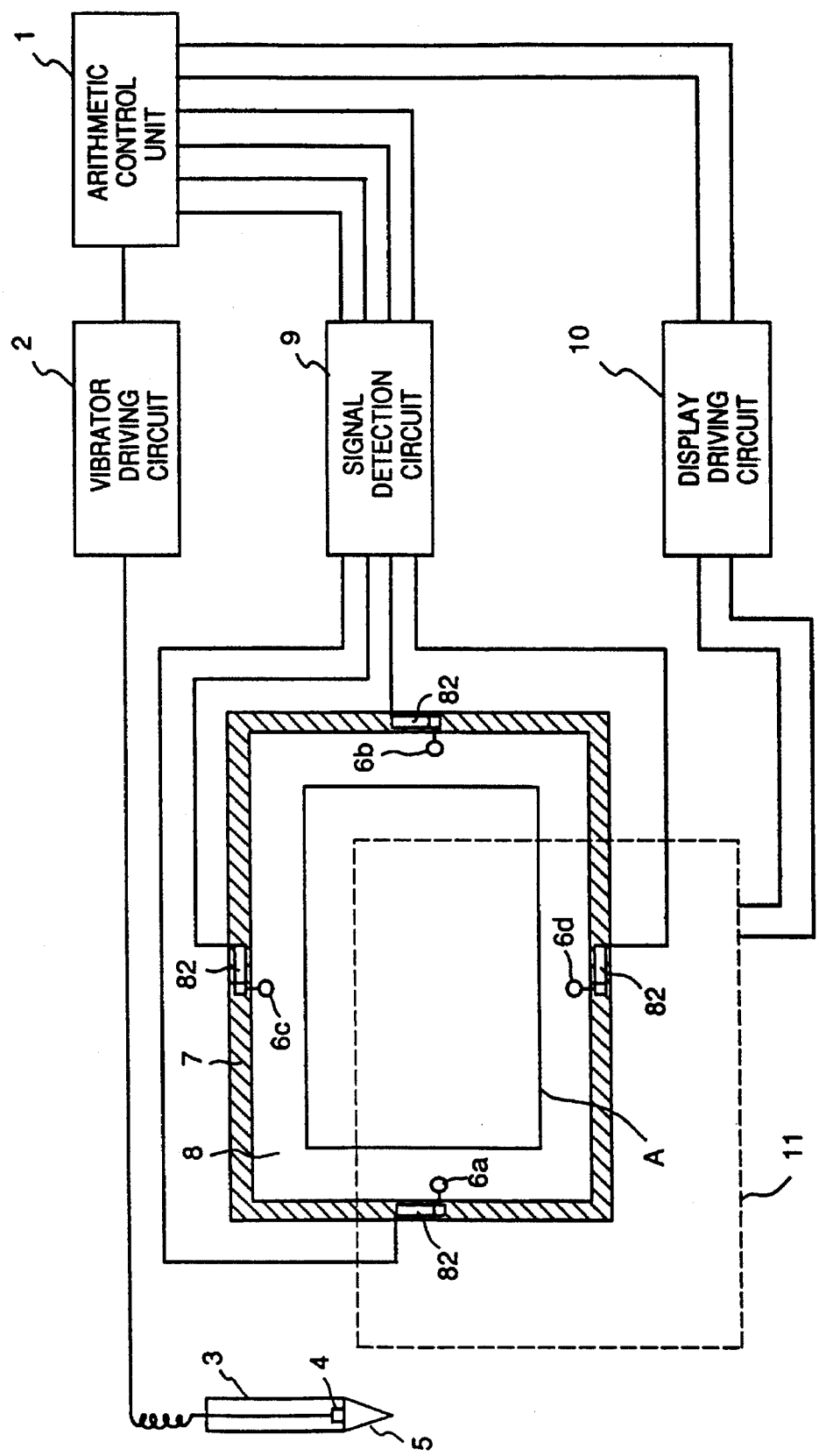
FIG. 13 is a diagram for explaining an arrangement of a coordinate input apparatus according to the second embodiment of the present invention.

FIG. 13 shows the structure of a coordinate input apparatus according to this embodiment. Referring to FIG. 13, an arithmetic control circuit 1 controls the entire apparatus, and calculates a coordinate position. A vibrator driving circuit 2 vibrates the pen tip of a vibration pen 3. A vibration transmission plate 8 consists of a transparent member such as an acrylic plate, a glass plate, or the like. A coordinate input operation using the vibration pen 3 is achieved by touching the surface of the vibration transmission plate 8 with the pen 3. More specifically, when a position in an input guarantee region A indicated by a solid line in FIG. 13 is designated by the vibration pen 3, a vibration generated by the vibration pen 3 is input to the vibration transmission plate 8, and the position coordinates of the vibration pen 3 can be calculated by measuring and processing the input vibration.

In order to prevent (eliminate) that a propagating wave is reflected by the end face of the vibration transmission plate 8, and returns to the central portion of the plate 8, vibration suppressors 7 are arranged on the outer periphery of the vibration transmission plate 8, and as shown in FIG. 13, vibration sensors 6a to 6d such as piezoelectric elements for converting a mechanical vibration into electrical signals are mounted near the inner sides of the vibration suppressors. Preamplifier circuit boards 82 are arranged on the peripheral portions of the vibration transmission plate 8 near the vibration sensors 6a to 6d. The arrangements for mounting these sensors and pre-amplifier circuit boards will be described in detail later. A signal detection circuit 9 outputs vibration detection signals from the vibration sensors 6a to 6d to the arithmetic control circuit 1. A display 11 comprises, e.g., a liquid crystal display, can perform a display operation in units of dots, and is arranged behind the vibration transmission plate. The display 11 displays dots at positions traced by the vibration pen 3 when it is driven by a display driving circuit 10, and a user observes the display via the vibration transmission plate 8 (consisting of a transparent member).

A vibrator 4 incorporated in the vibration pen 3 is driven by the vibrator driving circuit 2. A driving signal for the vibrator 4 is supplied as a low-level pulse signal from the arithmetic control circuit 1, and is amplified by the vibrator driving circuit 2 with a predetermined gain. Thereafter, the amplified driving signal is applied to the vibrator 4. The electrical driving signal is converted into a mechanical vibration by the vibrator 4, and is transmitted to the vibration transmission member 8 via a pen tip 5.

The vibration frequency of the vibrator 4 is selected to be a value capable of generating a Lamb wave in the vibration transmission plate 8 consisting of, e.g., glass. Upon driving of the vibrator, a mode for generating a vibration in a direction perpendicular to the vibration transmission plate 8 in FIG. 13 is selected. Also, when the vibration frequency of the vibrator 4 is selected to be a resonance frequency of a mass including the pen tip 5 of the input pen 3, efficient vibration conversion is assured. An elastic wave transmitted to the vibration transmission plate 8, as described above, is a Lamb wave, and is not easily influenced by scratches, obstacles, and the like on the surface of the vibration transmission plate as compared to a surface wave.

In the above-mentioned arrangement, the arithmetic control circuit 1 has the same functions as the arrangement described in the first embodiment, and the signal detection circuit 9 also has the same arrangement as that in the first embodiment.

The principle for measuring the vibration arrival time to the vibration sensors 6a to 6d, and the principle for calculating the coordinates based on the vibration transmission time are the same those in the first embodiment although the number of sensors is different from that in the first embodiment.

<Mounting of Sensors and Pre-amplifier Circuit Boards>

Figure 15:
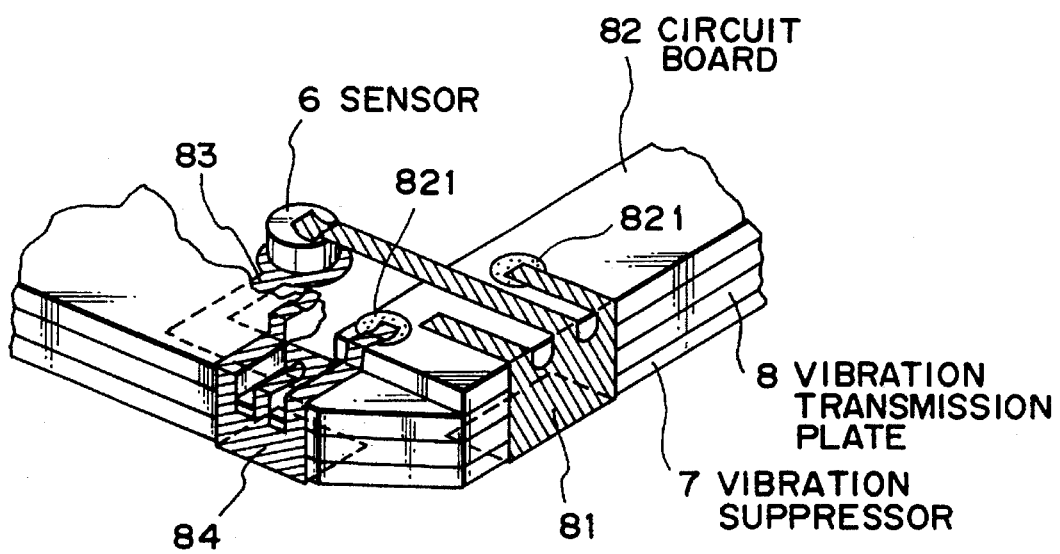
FIG. 15 is a perspective view for explaining the arrangement around the vibration sensor of the coordinate input device of the second embodiment.

FIG. 15 is a perspective view showing the detailed arrangement of a portion, near the sensor, of the vibration transmission plate (to be referred to as a sensor block hereinafter), which block is constituted by the vibration transmission plate 8, the vibration suppressor 7, the pre-amplifier circuit board 82, electrode leaf springs 81 and 84, and the sensor 6 (one of 6a to 6d). An electrode 821 for connecting the preamplifier circuit board 82 to the sensor 6 is arranged on the pre-amplifier circuit board 82. The vibration suppressor 7 is fixed to the vibration transmission plate 8 by an adhesion member (e.g., a double-adhesion tape). Furthermore, the board 82 is fixed on a portion, near the sensor 6, of the vibration suppressor 7 by an adhesion member, as described above. In this state, the leaf spring 81 as an electrode member for electrically connecting the electrode of the sensor 6 and the electrode 821 on the board 82 is attached to clamp both the vibration transmission plate 8 and the board 82. A conductive portion 83 to be connected to the other electrode of the sensor 6 is formed to extend to the peripheral portion of the vibration transmission plate 8. The leaf spring 84 is a good conductor, and is in contact with the conductive portion 83 and the electrode 821 of the board 82 to connect them. With this structure, compact leaf springs can be used as the electrode members for the sensors 6, and the sensor blocks can be rendered very compact.

Figure 16:
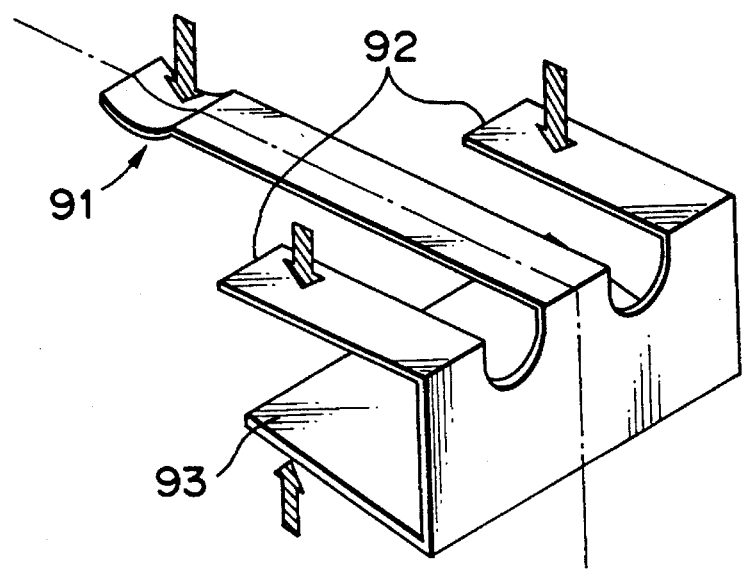
FIG. 16 is a perspective view showing the structure of a vibration sensor electrode member of the coordinate input device of the second embodiment.
Figure 18:
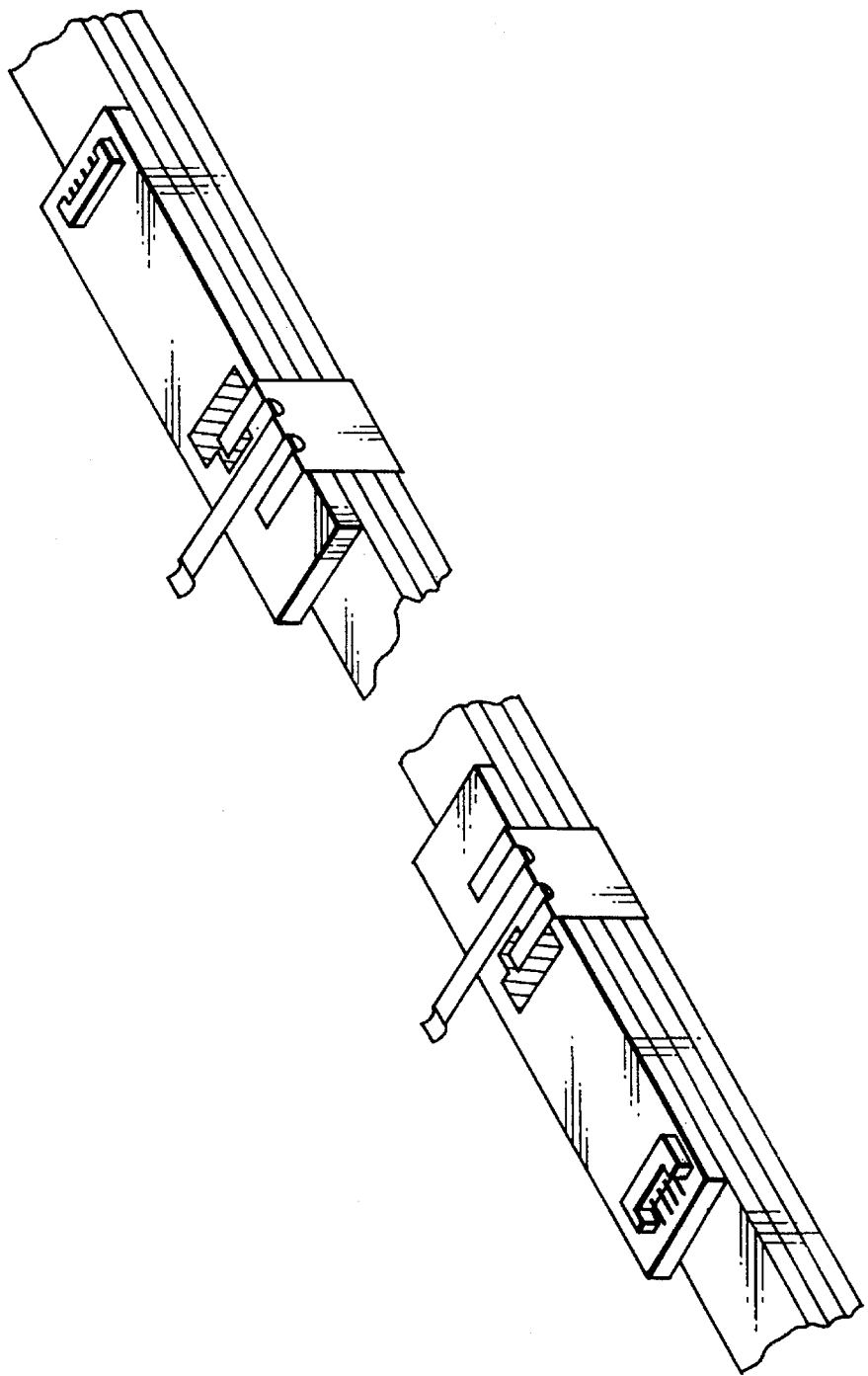
FIG. 18 is a perspective view showing a mounting structure of the vibration sensor electrode member of the coordinate input device of the second embodiment.

The leaf springs 81 and 84 will be described in detail below. The leaf spring 81 consists of a good conductor such as copper, and has a shape symmetrical about its central line, as shown in FIG. 16. This is to remove anisotropy of the leaf springs, and to use the leaf springs having the same shape for sensor mounting portions of all the sides of the substantially rectangular vibration transmission plate 8, as shown in FIG. 18. The leaf spring 81 has a pawl 91 contacting the sensor 6, and pawls 92 contacting the electrode 821 of the board 82. The leaf spring 81 fixes the vibration transmission plate 8, and the like by an elastic force between these pawls and an opposing pressing portion 93, while connecting the sensor 6 and the board 82 with the pawls. With this structure, compact leaf springs can be used as the electrode members for the sensors 6, and the sensor blocks can be rendered very compact.

Figure 17:
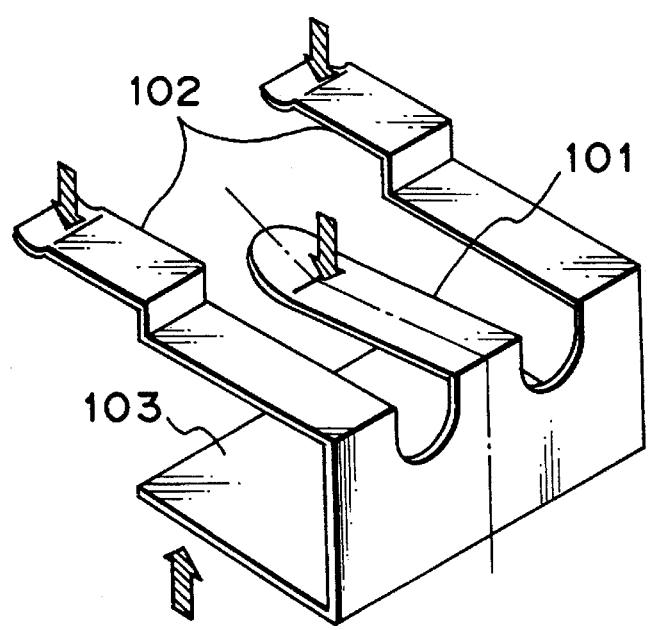
FIG. 17 is a perspective view showing the structure of the vibration sensor electrode member of the coordinate input device of the second embodiment.

The other leaf spring 84 shown in FIG. 17 has the same purpose as that of the leaf spring 810 However, the leaf spring 84 has a shape different from that of the leaf spring 81 since it is connected to the conductive portion 83 on the transmission plate, and the electrode 821 on the board 82 arranged thereon. In the leaf spring 84, pawls 102 contact the electrode 821, and a central pawl 101 contacts the conductive portion 83, thereby connecting them.

Since the board 82 is arranged on the vibration suppressor 7 using these leaf springs, a pre-amplifier 51 can be arranged near the sensor 6. This structure is effective as a noise countermeasure since a high-impedance input portion, which is easily susceptible to noise from the pre-amplifier 51, can be rendered very compact. Also, the pre-amplifier 51 does not influence an elastic wave on the vibration transmission plate 8 since it is arranged on the vibration suppressor 7.

In the manufacture of the apparatus, since a process for fixing sensor electrodes by soldering or screws can be omitted, the number of processes can be decreased, and the manufacturing cost can be reduced.

Furthermore, the vibration suppressors 7 can be fixed by the clamping force of the leaf springs 81 alone without using any adhesion member. With this arrangement, a process for adhering the vibration suppressors 7 to the vibration transmission plate 8 can also be omitted, and the manufacturing cost can be further reduced.

[THIRD EMBODIMENT]

As the third embodiment, a vibration input pen used in the above-mentioned coordinate input device will be described below.

A conventional vibration input pen suffers from the following drawbacks. More specifically, when a data input operation is performed, the pen tip of the vibration input pen wears by a friction with the vibration transmission plate. As the pen tip wears, the pen tip becomes thicker, resulting in poor operability upon operation by a user. In addition, since the contact area between the vibration transmission plate and the pen tip of the vibration input pen increases, the resolution of coordinate detection substantially decreases (in other words, a specific point to be output in the contact portion of the pen tip cannot be identified).

In order to solve these problems, the pen tip must be exchanged. However, conventionally, when the pen tip is detached, other constituting elements such as the vibrator are simultaneously disassembled, and the maintenance by a user is not easy. The pen as a whole may be exchanged. However, exchange cost then increases, and hence, running cost increases. As a method for increasing durability against wear, the pen tip may consist of a resin. However, with this method, the above-mentioned problems cannot be solved ultimately. Also, when the pen tip consists of a resin, an energy loss of a vibration increases, and the pen tip cannot be used as an electrode of the vibrator. For this reason, the electrode must be arranged as an independent member, resulting in a complicated arrangement of the apparatus.

Figure 19:
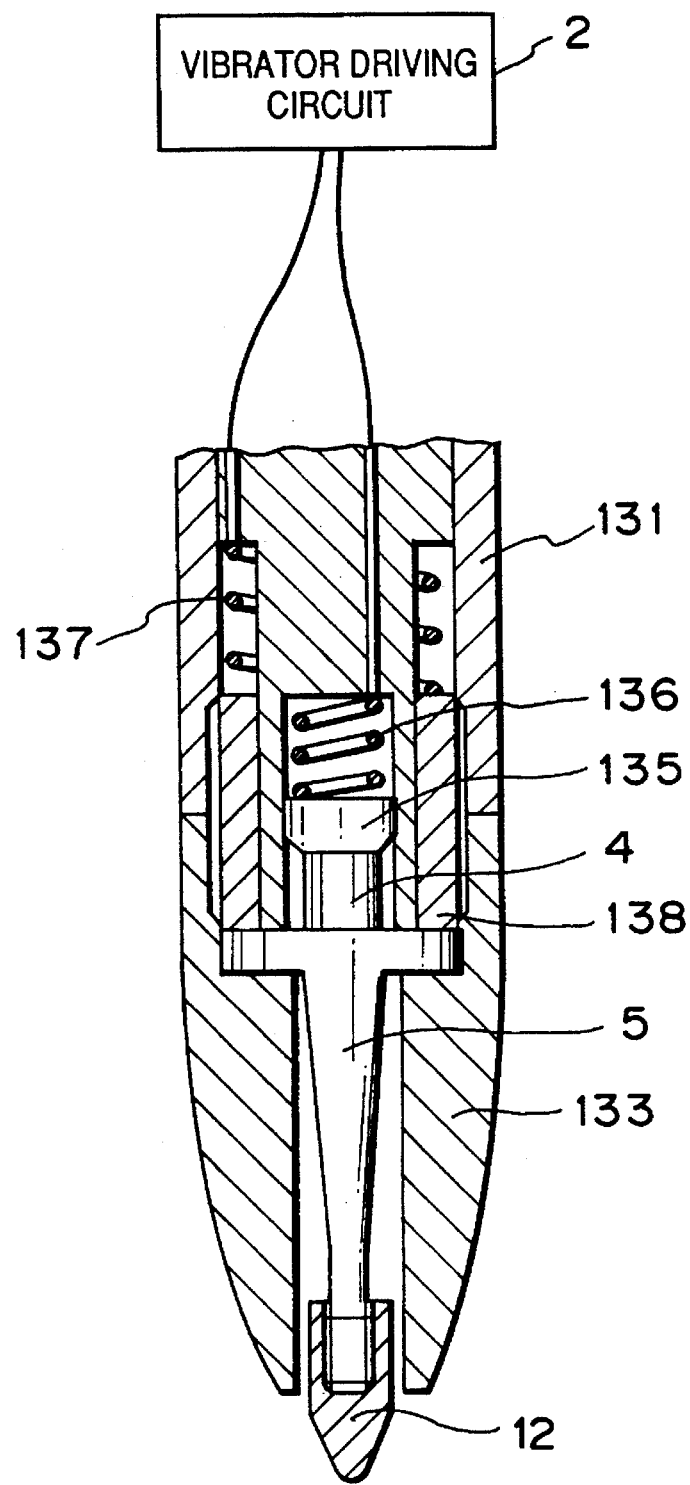
FIG. 19 is a sectional view showing a structure of a vibration input pen of a coordinate input device according to the third embodiment of the present invention.
Figure 20:
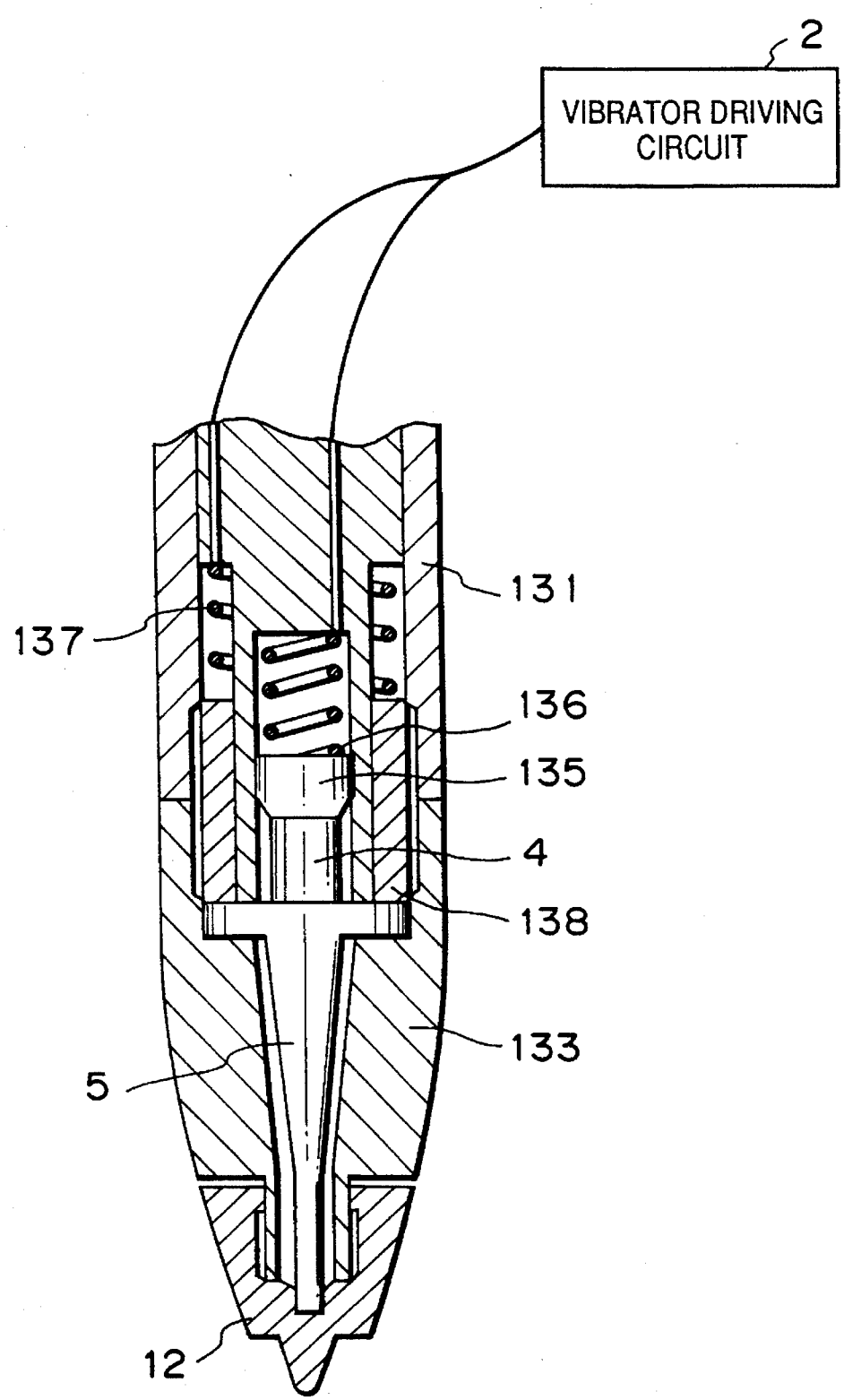
FIG. 20 is a sectional view showing a structure of a vibration input pen of a coordinate input device according to the fourth embodiment of the present invention.

FIGS. 19 and 20 are sectional views for explaining the structure of main part of a vibration pen of this embodiment. Referring to FIGS. 19 and 20, a vibrator 4 incorporated in a vibration pen 3 is driven by a vibrator driving circuit 2 (to be described later). An electrical driving signal is converted into a mechanical ultrasonic vibration by the vibrator 4, and the vibration is transmitted to a pen tip 12 via a vibration transmission member 5. When the pen tip 12 contacts a vibration transmission plate (to be described later), the vibration is input to the vibration transmission plate. The vibrator 4 has a columnar shape. In this embodiment, a K33 vibration mode in which the polarization direction of the vibrator 4 is parallel to the vibration direction is utilized. The vibrator 4 is adhered to a large end face of the vibration transmission member 5. One electrode of the vibrator 4 is connected to the vibrator driving circuit 2 via the vibration transmission member 5, a conductive ring 138, and an electrode spring 137. The other electrode of the member 4 is connected to the vibrator driving circuit 2 via an electrode pin 135 and an electrode spring 136. A pen housing 131 and a pen tip protection member 133 are fastened by the conductive ring 138 via a screw portion. The pen illustrated in FIG. 19 has a different shape of the pen tip 12 from the pen illustrated in FIG. 20.

The first requirement for the vibration pen 3 of the coordinate input apparatus utilizing a vibration is to efficiently input a vibration generated by the vibrator 4 to the vibration transmission plate, and the second requirement is to prevent a damage to the vibration transmission plate upon execution of an input operation. In order to meet the first requirement, a metal material such as aluminum, stainless steel, or the like is used as an optimal material for the pen tip 12 since it causes less energy loss. However, such a material damages the vibration transmission plate in a coordinate input operation. On the other hand, to meet the second requirement, a resin is preferred as compared to a metal.

In consideration of these requirements, in this embodiment, a vibration of the vibrator 4 is input to the vibration transmission plate using aluminum as a material of the vibration transmission member 5. Since the vibration transmission member 5 consists of a metal, it causes less energy loss. Also, even when the axial length of the vibration transmission member 5 becomes relatively large, the member 5 can sufficiently transmit a vibration. Furthermore, since the vibration transmission member 5 has a conductivity, it also serves as a member for electrical connection with the electrode of the vibrator 4.

The vibration transmission member 5 is fixed by the pen tip protection member 133 and the conductive ring 138, and the pen tip protection member 133 is provided with a screw for fixing the pen tip. When the pen tip 12 is coupled to the pen tip protection member 133 using this screw, a small end face of the vibration transmission member 5 contacts the pen tip 12 first, and in this state, a fastening torque of the screw is generated, thus fixing the pen tip.

In this embodiment, the pen tip 12 consists of polyamideimide which causes a relatively small energy loss of a vibration as compared to other resins (although the loss is considerably larger than that caused by a metal). In addition, the pen tip 12 has a high wear resistance, and does not damage the vibration transmission plate 5. Of course, a material which satisfies these two requirements, e.g., polyphenylene sulfide (pps) may be used.

In this manner, since a member for transmitting a vibration is inserted between the vibrator 4 as a vibration generation source and the pen tip 12, the pen tip can be easily exchanged. In addition, a stress can be prevented from being concentrated on the vibration transmission member 5 in a practical use, and a stable vibration can be input to the vibration transmission plate.

The present invention is not limited to the above embodiments and various changes and modifications can be made within the spirit and scope of the present invention. Therefore, to apprise the public of the scope of the present invention, the following claims are made.

What is claimed is:

1. A coordinate input apparatus comprising:
    a substantially rectangular vibration transmission plate provided with an input guarantee region where desired precision or resolution of a coordinate inputted from a vibration source is guaranteed;
    vibration detection means arranged at least at three corner portions on said vibration transmission plate;
    vibration suppression means which are arranged on a peripheral portion of said vibration transmission plate and along a path of a reflected wave of the vibration input in the input guarantee region to said detection means, except the corner portions where said detection means are arranged; and
    means for calculating coordinate of a position where the vibration is input by said vibration source on the basis of the vibration detected by sid vibration detection means.

2. A coordinate input apparatus comprising:
    a rectangular shaped vibration transmission plate;
    conversion means arranged at least at three corner portions of said vibration transmission plate, for detecting a vibration on said vibration transmission plate and converting the detected vibration into electrical signals;
    amplifier means for amplifying an output signal from said conversion means;
    a vibration suppression means arranged on a peripheral portion of said vibration transmission plate and along a path of a reflected wave of the vibration input in an input guarantee region to said conversion means;
    connection means for electrically connecting said conversion means and said amplifier means by clamping said conversion means and said amplifier means; and
    reading means for reading coordinate of a position where the vibration is input by said vibration source on the basis of the vibration detected by said conversion means.

3. The apparatus according to claim 2, wherein said conductive member is formed in a symmetrical pattern.

4. A coordinate input apparatus comprising:
    a vibration transmission plate;
    a vibrating pen for inputting a vibration to said vibration transmission plate;
    vibration detection means arranged at least at three corner portions of said vibration transmission plate, for detecting a vibration o said vibration transmission plate; and
    means for reading a coordinate of a position pointed by said vibrating pen,
    wherein said vibrating pen comprises a generation means for generating a vibration a vibration transmission member, pressed against said generation means, for transmitting the vibration and a pen tip member, removably installed to said vibration transmission member, for transmitting the vibration from said vibration transmission member to said vibration transmission plate.

5. The apparatus according to claim 4, wherein said pen tip member consists of a resin, and said vibration transmission member consists of a metal.

6. The apparatus according to claim 4, wherein said generation means converts input electric power into a mechanical vibration, and said vibration transmission member also serves as a conductive portion for supplying the electric power to said generation means.

7. A coordinate input apparatus comprising:
    a vibration transmission plate;
    a vibrating pen for inputting a vibration to said vibration transmission plate;
    vibration detection means arranged at least at three corner portions of said vibration transmission plate, for detecting a vibration of said vibration transmission plate; and
    means for reading a coordinate of a position pointed by said vibrating pen,
    wherein said vibrating pen comprises a generation means for generating a vibration by converting electric power into a mechanical vibration, a vibration transmission member which is made of metal and pressed against said generation means to transmit the vibration and the electric power and a resin pen tip, removably installed to said vibration transmission member, for transmitting the vibration from said vibration transmission member to said vibration transmission plate.

* * * * *

UNITED STATES PATENT AND TRADEMARK OFFICE
CERTIFICATE OF CORRECTION

PATENT NO. : 5,484,967
DATED : January 16, 1996
INVENTOR(S) : RYOZO YANAGISAWA, et al.

It is certified that error appears in the above-indentified patent and that said Letters Patent is hereby corrected as shown below:

COLUMN 1

Line 57, "stripeshaped" should read --stripe-shaped--.

COLUMN 3

Line 23, "Lnput" should read --input--.

COLUMN 7

Line 30, "stripeshaped" should read --stripe-shaped--.

COLUMN 9

Line 57, "propagaeion" should read --propagation--.

COLUMN 10

Line 5, "vibration." should read --vibration--.

COLUMN 11

Line 36, "tg' = tg + 35" should read --tg' = tg + et--.
    Line 38, "tp' = tp + 35 + toff" should read
        --tp' = tp + et + toff--.

UNITED STATES PATENT AND TRADEMARK OFFICE
CERTIFICATE OF CORRECTION

PATENT NO. : 5,484,967  Page 2 of 2
DATED : January 16, 1996
INVENTOR(S) : RYOZO YANAGISAWA, et al.

It is certified that error appears in the above-indentified patent and that said Letters Patent is hereby corrected as shown below:

COLUMN 15

Line 63, "Structure a" should read --Structure of a--.

COLUMN 17

Line 51, "spring 810" should read --spring 81.--.

COLUMN 19

Line 64, "coordinate" should read --coordinates--.
    Line 66, "sid" should read --said--.

COLUMN 20

Line 16, "coordinate" should read --coordinates--.
    Line 28, "o" should read --of--.
    Line 32, "vibration a" should read --vibration, a--.

Signed and Sealed this

Sixteenth Day of July, 1996

Attest:

BRUCE LEHMAN

Attesting Officer      Commissioner of Patents and Trademarks